(12) United States Patent
Blum et al.

(10) Patent No.: US 8,641,191 B2
(45) Date of Patent: Feb. 4, 2014

(54) STATIC PROGRESSIVE SURFACE REGION IN OPTICAL COMMUNICATION WITH A DYNAMIC OPTIC

(75) Inventors: Ronald D. Blum, Roanoke, VA (US); William Kokonaski, Gig Harbor, WA (US); Venkatramani S. Iyer, Roanoke, VA (US); Joshua N. Haddock, Roanoke, VA (US)

(73) Assignee: e-Vision, LLC, Roanoke, VA (US)

( * ) Notice: Subject to any disclaimer, the term of this patent is extended or adjusted under 35 U.S.C. 154(b) by 0 days.

(21) Appl. No.: 13/178,090

(22) Filed: Jul. 7, 2011

(65) Prior Publication Data

US 2012/0038882 A1 Feb. 16, 2012

Related U.S. Application Data

(63) Continuation of application No. 12/562,631, filed on Sep. 18, 2009, now Pat. No. 7,988,286, which is a continuation of application No. 11/808,759, filed on Jun. 12, 2007, now Pat. No. 7,604,349, which is a continuation-in-part of application No. 11/321,324, filed on Dec. 29, 2005, now abandoned, which is a continuation of application No. 11/091,104, filed on Mar. 28, 2005, now Pat. No. 7,188,948, which is a continuation of application No. 10/626,973, filed on Jul. 25, 2003, now Pat. No. 6,918,670, which is a (Continued)

(51) Int. Cl.
*G02C 7/00* (2006.01)
*G02C 7/02* (2006.01)
*G02C 7/04* (2006.01)

(52) U.S. Cl.
USPC ............... 351/159.4; 351/159.03; 351/159.15

(58) Field of Classification Search
USPC .................. 351/159, 159.03, 159.11, 159.15, 351/159.35, 159.39, 150.4; 349/13–14, 200
See application file for complete search history.

(56) References Cited

U.S. PATENT DOCUMENTS

| 2,576,581 A | 11/1951 | Edwards |
| 3,161,718 A | 12/1964 | DeLuca |

(Continued)

FOREIGN PATENT DOCUMENTS

| CN | ROC89113088 | 10/2001 |
| DE | 4223395 | 1/1994 |

(Continued)

OTHER PUBLICATIONS

Kowel, S. T., et. al; "Focusing by electrical modulation of refraction in a liquid crystal cell" *Applied Optics*, Jan. 15, 1984; 23:2.

(Continued)

*Primary Examiner* — Jordan Schwartz
(74) *Attorney, Agent, or Firm* — Michael Haynes PLC; Michael N. Haynes

(57) ABSTRACT

An ophthalmic lens is presented in which the lens includes a progressive addition region and a dynamic optic. The dynamic optic and the progressive addition region are in optical communication. The progressive addition region has an add power which is less than a user's near viewing distance add power. The dynamic optic, when activated, provides the additional needed optical power for the wearer to see clearly at a near distance. This combination leads to the unexpected result that not only does the wearer have the ability to see clearly at intermediate and near distances, but the level of unwanted astigmatism, distortion, and vision compromise are reduced significantly.

11 Claims, 21 Drawing Sheets

Related U.S. Application Data continuation of application No. 09/602,013, filed on Jun. 23, 2000, now Pat. No. 6,619,799.

(60) Provisional application No. 60/876,464, filed on Dec. 22, 2006, provisional application No. 60/854,707, filed on Oct. 27, 2006, provisional application No. 60/812,952, filed on Jun. 13, 2006, provisional application No. 60/812,625, filed on Jun. 12, 2006, provisional application No. 60/142,053, filed on Jul. 2, 1999, provisional application No. 60/143,626, filed on Jul. 14, 1999, provisional application No. 60/147,813, filed on Aug. 10, 1999, provisional application No. 60/150,545, filed on Aug. 25, 1999, provisional application No. 60/150,564, filed on Aug. 25, 1999, provisional application No. 60/161,363, filed on Oct. 26, 1999.

(56) References Cited

U.S. PATENT DOCUMENTS

| | | | |
|---|---|---|---|
| 3,245,315 A | 4/1966 | Marks et al. | |
| 3,309,162 A | 3/1967 | Kosanke et al. | |
| 3,614,215 A | 10/1971 | Mackta | |
| 3,738,734 A | 6/1973 | Tait et al. | |
| 3,791,719 A | 2/1974 | Kratzer et al. | |
| 4,062,629 A | 12/1977 | Winthrop | |
| 4,174,156 A | 11/1979 | Glorieux | |
| 4,181,408 A | 1/1980 | Senders | |
| 4,190,330 A | 2/1980 | Berreman | |
| 4,264,154 A | 4/1981 | Petersen | |
| 4,279,474 A | 7/1981 | Belgorod | |
| 4,300,818 A | 11/1981 | Schachar | |
| 4,373,218 A | 2/1983 | Schachar | |
| 4,395,736 A | 7/1983 | Fraleux | |
| 4,418,990 A | 12/1983 | Gerber | |
| 4,423,929 A | 1/1984 | Gomi | |
| 4,457,585 A | 7/1984 | DuCorday | |
| 4,461,550 A | 7/1984 | Legendre | |
| 4,466,703 A | 8/1984 | Nishimoto | |
| 4,466,706 A | 8/1984 | Lamothe, II | |
| 4,529,268 A | 7/1985 | Brown | |
| 4,537,479 A | 8/1985 | Shinohara et al. | |
| 4,537,497 A | 8/1985 | Masuda | |
| 4,564,267 A | 1/1986 | Nishimoto | |
| 4,572,616 A | 2/1986 | Kowel et al. | |
| 4,577,928 A | 3/1986 | Brown | |
| 4,601,545 A | 7/1986 | Kern | |
| 4,609,824 A | 9/1986 | Munier et al. | |
| 4,712,870 A | 12/1987 | Robinson et al. | |
| 4,756,605 A | 7/1988 | Okada et al. | |
| 4,772,094 A | 9/1988 | Sheiman | |
| D298,250 S | 10/1988 | Kildall | |
| 4,787,733 A | 11/1988 | Silva | |
| 4,787,903 A | 11/1988 | Grendahl | |
| 4,795,248 A | 1/1989 | Okada et al. | |
| 4,813,777 A | 3/1989 | Rainville et al. | |
| 4,818,095 A | 4/1989 | Takeuchi | |
| 4,836,652 A | 6/1989 | Oishi et al. | |
| 4,842,400 A | 6/1989 | Klein | |
| 4,880,300 A | 11/1989 | Payner et al. | |
| 4,890,903 A | 1/1990 | Treisman et al. | |
| 4,904,063 A | 2/1990 | Okada et al. | |
| 4,907,860 A | 3/1990 | Noble | |
| 4,909,626 A | 3/1990 | Purvis et al. | |
| 4,919,520 A | 4/1990 | Okada et al. | |
| 4,921,728 A | 5/1990 | Takiguchi | |
| 4,927,241 A | 5/1990 | Kuijk | |
| 4,929,865 A | 5/1990 | Blum | |
| 4,930,884 A | 6/1990 | Tichenor et al. | |
| 4,944,584 A | 7/1990 | Maeda et al. | |
| 4,945,242 A | 7/1990 | Berger et al. | |
| 4,952,788 A | 8/1990 | Berger et al. | |
| 4,955,712 A | 9/1990 | Barth et al. | |
| 4,958,907 A | 9/1990 | Davis | |
| 4,961,639 A | 10/1990 | Lazarus | |
| 4,968,127 A | 11/1990 | Russell et al. | |
| 4,981,342 A | 1/1991 | Fiala | |
| 4,991,951 A | 2/1991 | Mizuno et al. | |
| 5,015,086 A | 5/1991 | Okaue et al. | |
| 5,030,882 A | 7/1991 | Solero | |
| 5,050,981 A | 9/1991 | Roffman | |
| 5,066,301 A | 11/1991 | Wiley | |
| 5,067,795 A | 11/1991 | Senatore | |
| 5,073,021 A | 12/1991 | Marron | |
| 5,076,665 A | 12/1991 | Petersen | |
| 5,089,023 A | 2/1992 | Swanson | |
| 5,091,801 A | 2/1992 | Ebstein | |
| 5,097,352 A * | 3/1992 | Takahashi et al. | 349/57 |
| 5,108,169 A | 4/1992 | Mandell | |
| 5,114,628 A | 5/1992 | Hofer et al. | |
| 5,124,734 A | 6/1992 | Barnea | |
| 5,130,856 A | 7/1992 | Tichenor et al. | |
| 5,142,411 A | 8/1992 | Fiala | |
| 5,150,234 A * | 9/1992 | Takahashi et al. | 349/1 |
| 5,171,266 A | 12/1992 | Wiley et al. | |
| 5,182,585 A | 1/1993 | Stoner | |
| 5,184,156 A | 2/1993 | Black et al. | |
| 5,200,859 A | 4/1993 | Payner et al. | |
| 5,208,688 A | 5/1993 | Fergason et al. | |
| 5,229,797 A | 7/1993 | Futhey et al. | |
| 5,229,885 A | 7/1993 | Quaglia | |
| 5,231,430 A | 7/1993 | Kohayakawa | |
| 5,239,412 A | 8/1993 | Naka et al. | |
| D342,063 S | 12/1993 | Howitt et al. | |
| 5,305,028 A | 4/1994 | Okano | |
| 5,306,926 A | 4/1994 | Yonemoto | |
| 5,324,930 A | 6/1994 | Jech, Jr. | |
| D350,342 S | 9/1994 | Sack | |
| 5,352,886 A | 10/1994 | Kane | |
| 5,359,444 A | 10/1994 | Piosenka et al. | |
| 5,375,006 A | 12/1994 | Haas | |
| 5,382,986 A | 1/1995 | Black et al. | |
| 5,386,308 A | 1/1995 | Michel et al. | |
| 5,424,927 A | 6/1995 | Schaller et al. | |
| 5,440,357 A | 8/1995 | Quaglia | |
| 5,443,506 A | 8/1995 | Garabet | |
| 5,451,766 A | 9/1995 | Van Berkel | |
| 5,488,439 A | 1/1996 | Weltmann | |
| 5,522,323 A | 6/1996 | Richard | |
| 5,552,841 A | 9/1996 | Gallorini et al. | |
| 5,608,567 A | 3/1997 | Grupp | |
| 5,615,588 A | 4/1997 | Gottschald | |
| 5,644,374 A | 7/1997 | Mukaiyama et al. | |
| 5,654,786 A | 8/1997 | Bylander | |
| 5,668,620 A | 9/1997 | Kurtin et al. | |
| 5,682,223 A | 10/1997 | Menezes et al. | |
| 5,683,457 A | 11/1997 | Gupta et al. | |
| RE35,691 E | 12/1997 | Theirl et al. | |
| 5,710,615 A | 1/1998 | Kitani | |
| 5,712,721 A | 1/1998 | Large | |
| 5,728,155 A | 3/1998 | Anello et al. | |
| 5,739,959 A | 4/1998 | Quaglia | |
| 5,777,719 A | 7/1998 | Williams et al. | |
| 5,815,233 A | 9/1998 | Morokawa et al. | |
| 5,815,239 A | 9/1998 | Chapman et al. | |
| 5,861,936 A | 1/1999 | Sorensen | |
| 5,877,876 A | 3/1999 | Birdwell | |
| 5,900,720 A | 5/1999 | Kallman et al. | |
| 5,949,521 A | 9/1999 | Williams et al. | |
| 5,953,098 A | 9/1999 | Lieberman et al. | |
| 5,956,183 A | 9/1999 | Epstein et al. | |
| 5,963,300 A | 10/1999 | Horwitz | |
| 5,971,540 A | 10/1999 | Ofner | |
| 5,980,037 A | 11/1999 | Conway | |
| 5,999,328 A | 12/1999 | Kurtin et al. | |
| 6,040,947 A | 3/2000 | Kurtin et al. | |
| 6,050,687 A | 4/2000 | Bille et al. | |
| 6,069,742 A | 5/2000 | Silver | |
| 6,086,203 A | 7/2000 | Blum et al. | |
| 6,086,204 A | 7/2000 | Magnante | |
| 6,095,651 A | 8/2000 | Williams et al. | |
| 6,099,117 A | 8/2000 | Gregory | |

(56) References Cited

U.S. PATENT DOCUMENTS

| | | |
|---|---|---|
| 6,115,177 A | 9/2000 | Vossler |
| 6,145,987 A | 11/2000 | Baude et al. |
| 6,188,525 B1 | 2/2001 | Silver |
| 6,191,881 B1 | 2/2001 | Tajima |
| 6,213,602 B1 | 4/2001 | Smarto |
| 6,270,220 B1 | 8/2001 | Keren |
| 6,271,915 B1 | 8/2001 | Frey et al. |
| 6,305,802 B1 | 10/2001 | Roffman et al. |
| 6,325,508 B1 | 12/2001 | Decreton et al. |
| 6,350,031 B1 | 2/2002 | Lashkari et al. |
| 6,390,623 B1 | 5/2002 | Kokonaski et al. |
| 6,396,622 B1 | 5/2002 | Alden |
| 6,437,762 B1 | 8/2002 | Birdwell |
| 6,437,925 B1 | 8/2002 | Nishioka |
| 6,464,363 B1 | 10/2002 | Nishioka et al. |
| 6,491,394 B1 | 12/2002 | Blum et al. |
| 6,501,443 B1 | 12/2002 | McMahon |
| 6,554,425 B1 | 4/2003 | Roffman et al. |
| 6,607,271 B2 | 8/2003 | Bar et al. |
| 6,609,794 B2 | 8/2003 | Levine |
| 6,614,408 B1 | 9/2003 | Mann |
| 6,616,275 B1 | 9/2003 | Dick et al. |
| 6,616,279 B1 | 9/2003 | Davis et al. |
| 6,618,208 B1 | 9/2003 | Silver |
| 6,626,532 B1 | 9/2003 | Nishioka et al. |
| 6,631,001 B2 | 10/2003 | Kuiseko |
| 6,682,195 B2 | 1/2004 | Dreher |
| 6,709,105 B2 | 3/2004 | Menezes |
| 6,709,108 B2 | 3/2004 | Levine et al. |
| 6,738,199 B2 | 5/2004 | Nishioka |
| 6,768,536 B2 | 7/2004 | Okuwaki et al. |
| 6,774,871 B2 | 8/2004 | Birdwell |
| 6,778,246 B2 | 8/2004 | Sun et al. |
| 6,833,938 B2 | 12/2004 | Nishioka |
| 6,840,619 B2 | 1/2005 | Dreher |
| 6,851,805 B2 | 2/2005 | Blum et al. |
| 6,871,951 B2 | 3/2005 | Blum et al. |
| 6,883,916 B2 | 4/2005 | Menezes |
| 6,886,938 B1 | 5/2005 | Menezes |
| 6,893,124 B1 | 5/2005 | Kurtin |
| 6,918,670 B2 | 7/2005 | Blum et al. |
| 6,948,818 B2 | 9/2005 | Williams et al. |
| 6,951,391 B2 | 10/2005 | Morris et al. |
| 6,955,433 B1 | 10/2005 | Wooley et al. |
| 6,956,682 B2 | 10/2005 | Wooley |
| 6,986,579 B2 | 1/2006 | Blum et al. |
| 7,008,054 B1 | 3/2006 | Kurtin et al. |
| 7,009,757 B2 | 3/2006 | Nishioka et al. |
| 7,019,890 B2 | 3/2006 | Meredith et al. |
| 7,041,133 B1 | 5/2006 | Azar |
| 7,085,065 B2 | 8/2006 | Silver |
| 7,090,348 B2 | 8/2006 | Nason et al. |
| 7,133,172 B2 | 11/2006 | Nishioka |
| 7,159,983 B2 | 1/2007 | Menezes et al. |
| 7,229,173 B2 | 6/2007 | Menezes et al. |
| 7,393,101 B2 | 7/2008 | Blum et al. |
| 7,396,126 B2 | 7/2008 | Blum et al. |
| 7,404,636 B2 | 7/2008 | Blum et al. |
| 7,604,349 B2 | 10/2009 | Blum et al. |
| 2001/0040735 A1 | 11/2001 | Schachar |
| 2002/0001061 A1 | 1/2002 | Chauveau et al. |
| 2002/0140899 A1 | 10/2002 | Blum et al. |
| 2002/0149739 A1 | 10/2002 | Perrott et al. |
| 2002/0186346 A1 | 12/2002 | Stantz et al. |
| 2003/0018383 A1 | 1/2003 | Azar |
| 2003/0151721 A1 | 8/2003 | Lai et al. |
| 2003/0210377 A1 | 11/2003 | Blum et al. |
| 2004/0008319 A1 | 1/2004 | Lai et al. |
| 2004/0108971 A1 | 6/2004 | Waldern et al. |
| 2004/0117011 A1 | 6/2004 | Aharoni et al. |
| 2004/0130677 A1 | 7/2004 | Liang et al. |
| 2004/0179280 A1 | 9/2004 | Nishioka |
| 2004/0196435 A1 | 10/2004 | Dick et al. |
| 2004/0246440 A1 | 12/2004 | Andino et al. |
| 2005/0073739 A1 | 4/2005 | Meredith et al. |
| 2005/0124983 A1 | 6/2005 | Frey et al. |
| 2005/0185135 A1* | 8/2005 | Blum et al. ............. 351/168 |
| 2005/0237485 A1 | 10/2005 | Blum et al. |
| 2005/0280769 A1* | 12/2005 | Cano et al. ............... 351/41 |
| 2006/0044510 A1 | 3/2006 | Williams et al. |
| 2007/0052920 A1 | 3/2007 | Stewart et al. |
| 2007/0216851 A1* | 9/2007 | Matsumoto ............ 349/200 |
| 2008/0055536 A1* | 3/2008 | Shimozono et al. ...... 349/200 |
| 2008/0180630 A1* | 7/2008 | Clarke et al. ............ 349/201 |

FOREIGN PATENT DOCUMENTS

| | | |
|---|---|---|
| EP | 0 027 339 | 4/1981 |
| EP | 0154962 | 9/1985 |
| EP | 0 225 034 | 6/1987 |
| EP | 0233104 | 8/1987 |
| EP | 0237365 | 9/1987 |
| EP | 0 308 705 | 3/1989 |
| EP | 0 578 833 | 1/1994 |
| EP | 0 649 044 | 4/1995 |
| GB | 2170613 | 8/1986 |
| GB | 2169417 | 7/1987 |
| JP | 55-076323 | 6/1980 |
| JP | 61 156227 | 7/1986 |
| JP | 61 177429 | 8/1986 |
| JP | 63-38915 A | 2/1988 |
| JP | 1-179911 A | 7/1989 |
| JP | 1237610 | 9/1989 |
| JP | 4-273211 A | 9/1992 |
| JP | 05-100201 | 4/1993 |
| JP | 11352445 | 12/1998 |
| JP | 2005-519684 A | 7/2005 |
| JP | 2005-535942 A | 11/2005 |
| TW | 460279 | 10/2001 |
| TW | 200604618 A | 2/2006 |
| TW | 200831979 A | 8/2008 |
| WO | WO 92/01417 | 2/1992 |
| WO | WO 98/27863 | 7/1998 |
| WO | WO 99/27334 | 6/1999 |
| WO | WO 01/02895 A1 | 1/2001 |
| WO | WO 03/050472 | 6/2003 |
| WO | WO 03/068059 | 8/2003 |
| WO | WO 03/077012 A2 | 9/2003 |
| WO | WO 2004/008189 | 1/2004 |
| WO | WO 2004/015460 A2 | 2/2004 |
| WO | WO 2004/015481 | 2/2004 |
| WO | WO 2004/034095 | 4/2004 |
| WO | WO 2004/072687 | 8/2004 |
| WO | WO 2005/017572 A2 | 2/2005 |

OTHER PUBLICATIONS

Thibos, L. N, et. al ; "Vision through a liquid-crystal spatial light modulator" *Adaptive Optics Conference*; 1999 Durham. UK.

Miller, D. T., et. al.; "Requirements for Segmented Spatial Light Modulators for Diffraction-Limited Imaging Through Aberrated Eyes", *Adaptive Optics Conference*; 1999 Durham, UK.

Thibos, L. N , et. al ; "Use of Liquid-Crystal Adaptive-Optics to Alter the Refractive State of the Eye" *Optometry and Vision Science* Jul. 1997; 74:7; American Academy of Optometry.

Thibos, L. N., et. al; "Electronic Spectacles for the 21st Century", *Indian Journal of Optometry*, Spring 1999; 2:1.

Bradley, A., "Profile: Larry N. Thibos, PhD, and Donald T. Miller, PhD"; *Indian Journal of Optometry*; Spring 1999; 2:1, p. 1 only.

Naumov, A.F.; "Control Optimization of Spherical Modal Liquid Crystal Lenses" *Optics Express*, Apr, 26, 1999; 4:9; Optical Society of America.

Naumov, A.F.; "Liquid Crystal Adaptive Lenses with Modal Control" *Optics Letters*, Jul. 1, 1998. 23:13; Optical Society of America.

"Liquid Lenses Eye Commercial Breakthrough" Opto & Laser Europe, Nov. 2003.

Anderson, M.; "Adaptive Optics: Liquid Crystals Lower the Cost of Adaptive Optics" *Laser Focus World*, Dec. 1999.

Davis, R. A.; "Computer Vision Syndrome—The Eyestrain Epidemic" *Review of Optometry*, Sep. 15, 1997.

(56) References Cited

OTHER PUBLICATIONS

Lazarus, S. M.; "The Use of Yoked Base-Up and Base-In Prism for Reducing Eye Strain at the Computer " *Journal of the American Optometric Association*, Apr. 1996.
Eyecare Business, Oct. 1997.
European Search Report for application No. EP 07 11 2473 dated Oct. 23, 2007.
Fowler et al., "Liquid crystal lens review", Ophthal. Physiol. Opt., 1990, vol. 10, pp. 186-194.
Guilino et al., "New Progressive Surfaces" Deutche Optikerzeitung, Germany, Nov. 20, 1980, pp. 20-23.
European Search Report for application No. EP 07 79 5996 dated May 26, 2011.
U.S. Appl. No. 12/562,631, filed Sep. 18, 2009.
U.S. Appl. No. 11/808,759, filed Jun. 12, 2007.
U.S. Appl. No. 11/321,324, filed on Dec. 29, 2005.
U.S. Appl. No. 11/091,104, filed on Mar. 28, 2005.
U.S. Appl. No. 10/626,973, filed Jul. 25, 2003.
U.S. Appl. No. 09/602,013, filed Jun. 23, 2000.
U.S. Appl. No. 60/142,053, filed Jul. 2, 1999.
U.S. Appl. No. 60/143,626, filed Jul. 14, 1999.
U.S. Appl. No. 60/147,813, filed Aug. 10, 1999.
U.S. Appl. No. 60/150,545, filed Aug. 25, 1999.
U.S. Appl. No. 60/150,564, filed Aug. 25, 1999.
U.S. Appl. No. 60/161,363, filed Oct. 26, 1999.
English translation of Notice of Reasons for Rejection for JP Appl. No. 2009-515447, mailed Feb. 5, 2013, 7 pgs.

* cited by examiner

STATIC PROGRESSIVE SURFACE REGION IN OPTICAL COMMUNICATION WITH A DYNAMIC OPTIC

CROSS REFERENCE TO RELATED APPLICATIONS

This application claims priority from and incorporates by reference in their entirety the following provisional applications:

U.S. Ser. No 60/812,625 filed on 12 Jun. 2006 and entitled "Progressive Region Surface in Optical Communication with Blended Near Region";

U.S. Ser. No. 60/812,952 filed on 13 Jun. 2006 and entitled "Progressive Region Area in Optical Communication with Blended Near Optical Zone";

U.S. Ser. No. 60/854,707 filed on 27 Oct. 2006 and entitled "Static Progressive Surface Region in Optical Communication with a Dynamic Optic"; and U.S. Ser. No. 60/876,464 filed on 22 Dec. 2006 and entitled "Advanced Ophthalmic Lens, Design, & Eyewear System Having Progressive Power Region"

This application is a continuation of, and claims priority to and benefit under 35 U.S.C. 120 to, U.S. patent application Ser. No. 12/562,631, titled "Static Progressive Surface Region in Optical Communication With a Dynamic Optic" filed Sep. 18, 2009, which is, in turn, a continuation of U.S. patent application Ser. No. 11/808,759, titled "Static Progressive Surface Region in Optical Communication With a Dynamic Optic" filed Jun. 12, 2007, now U.S. Pat. No. 7,604, 349, which is, in turn, a continuation in part of U.S. patent application Ser. No. 11/321,324, titled "Ophthalmic Lens for Correcting Non-Conventional Refractive Error" filed on 29 Dec. 2005, now abandoned, which is, in turn, a continuation of U.S. patent application Ser. No. 11/091,104, titled "System, Apparatus, and Method for Correcting Vision Using an Electro-Active Lens" filed on 28 Mar. 2005, now U.S. Pat. No. 7,188,948, which is, in turn, a continuation of U.S. patent application Ser. No. 10/626,973, titled "System, Apparatus, and Method for Correcting Vision Using an Electro-Active Lens" filed 25 Jul. 2003, now U.S. Pat. No. 6,918,670, which is, in turn, a continuation of U.S. patent application Ser. No. 09/602,013, titled "Optical Lens System With Electro-Active Lens Having Alterably Different Focal Lengths" filed 23 Jun. 2000, now U.S. Pat. No. 6,619,799, and which, in turn, claims priority to the following U.S. Provisional Patent Applications:

Ser. No. 60/142,053, titled "Electro-Active Spectacles", filed 2 Jul. 1999;

Ser. No. 60/143,626, titled "Electro-Active Spectacles", filed 14 Jul. 1999;

Ser. No. 60/147,813, titled "Electro-Active Ref/action, Dispensing, & Eyewear", filed 10 Aug. 1999;

Ser. No 60/150,545, titled "Advanced Electro-Active Spectacles", filed 25 Aug. 1999;

Ser. No. 60/150,564, titled "Electro-Active Refraction, Dispensing, & Eyewear", filed 25 Aug. 1999; and Ser. No. 60/161,363, titled "Comprehensive Electro-Active Refraction, Dispensing, & Eyewear", filed 26 Oct. 1999.

The contents of each of the foregoing priority applications are hereby incorporated herein by reference in their entireties.

BACKGROUND OF THE INVENTION

1. Field of the Invention

The present invention relates to multifocal ophthalmic lenses, lens designs, lens systems, and eyewear products or devices utilized on, in or about the eye More specifically, the present invention relates to multifocal ophthalmic lenses, lens designs, lens systems, and eyewear products which provide an optical effect/end result that in most cases reduces unwanted distortion, unwanted astigmatism, and vision compromises associated with Progressive Addition Lenses to a very acceptable range for the wearer 2. Description of the Prior Art Presbyopia is the loss of accommodation of the crystalline lens of the human eye that often accompanies aging. This loss of accommodation results in an inability to focus on near distance objects. The standard tools for correcting presbyopia are multifocal ophthalmic lenses. A multifocal lens is a lens that has more than one focal length (i.e. optical power) for correcting focusing problems across a range of distances. Multifocal ophthalmic lenses work by means of a division of the lens's area into regions of different optical powers. Typically, a relatively large area located in the upper portion of the lens corrects for far distance vision errors, if any. A small area located in the bottom portion of the lens provides additional optical power for correcting near distance vision errors caused by presbyopia. A multifocal lens may also contain a small region located near the middle portion of the lens which provides additional optical power for correcting intermediate distance vision errors.

The transition between the regions of different optical power may be either abrupt, as is the case for bifocal and trifocal lenses, or smooth and continuous, as is the case with Progressive Addition Lenses. Progressive Addition Lenses are a type of multifocal lenses that comprise a gradient of continuously increasing positive dioptric optical power from the beginning of the far distance viewing zone of the lens to the near distance viewing zone in the lower portion of the lens. This progression of optical power generally starts at approximately what is known as the fitting cross or fitting point of the lens and continues until the full add power is realized in the neat distance viewing zone and then plateaus Conventional and state-of-the-art Progressive Addition Lenses utilize a surface topography on one or both exterior surfaces of the lens shaped to create this progression of optical power. Progressive Addition Lenses are known within the optical industry when plural as PALs or when singular as a PAL. PAL lenses are advantageous over traditional bifocal and trifocal lenses in that they can provide a user with a lineless, cosmetically pleasing multifocal lens with continuous vision correction when focusing on objects at a far distance to objects at a near distance or vice versa.

While PALs are now widely accepted and in vogue within the USA and throughout the world as a correction for presbyopia, they also have serious vision compromises These compromises include but are not limited to unwanted astigmatism, distortion, and perceptual blur. These vision compromises may affect a user's horizontal viewing width, which is the width of the visual field that can be seen clearly as a user looks from side to side while focused at a given distance. Thus, PAL lenses may have a narrow horizontal viewing width when focusing at an intermediate distance, which can make viewing a large section of a computer screen difficult. Similarly, PAL lenses may have a narrow horizontal viewing width when focusing at a near distance, which can make viewing the complete page of a book or newspaper difficult. Far distance vision may be similarly affected. PAL lenses may also present a difficulty to a wearer when playing sports due to the distortion of the lenses. Additionally, because the optical add power is placed in the bottom region of the PAL lens, the wearer must tilt his or her head back to make use of this region when viewing an object above his or her head which is located at a near or intermediate distance. Contrastingly, when a wearer is descending stairs and assumes a downward glance, a near distance focus is provided by the lens instead of the far distance focus necessary to see one's feet and the stairs clearly. Thus, the wearer's feet will be out of focus and appear blurred. In addition to these limitations, many wearers of PALs experience an unpleasant effect known as visual motion (often referred to as "swim") due to the unbalanced distortion that exists in each of the lenses. In fact, many people refuse to wear such lenses because of this effect.

When considering the near optical power needs of a presbyopic individual, the amount of near optical power required is directly related to the amount of accommodative amplitude (near distance focusing ability) the individual has left in his or eyes Generally, as an individual ages the amount of accommodative amplitude decreases. Accommodative amplitude may also decrease for various health reasons. Therefore, as one ages and becomes more presbyopic, the optical power needed to correct one's ability to focus at a near viewing distance and an intermediate viewing distance becomes stronger in terms of the needed dioptric optical add power. By way of example only, an individual 45 years old may need +1 00 diopters of near viewing distance optical power to see clearly at a near point distance, while an individual 80 years old may need +2 75 diopters to +3 00 diopters of near viewing distance optical power to see clearly at the same near point distance. Because the degree of vision compromises in PAL lenses increases with dioptric optical add power, a more highly presbyopic individual will be subject to greater vision compromises. In the example above, the individual who is 45 years of age will have a lower level of distortion associated with his or her lenses than the individual who is 80 years of age. As is readily apparent, this is the complete opposite of what is needed given the quality of life issues associated with being elderly, such as flailty or loss of dexterity. Prescription multifocal lenses that add compromises to vision function and inhibit safety are in sharp contrast to lenses that make lives easier, safer, and less complex.

By way of example only, a conventional PAL with a +1.00 D near optical power may have approximately +1.00 D or less of unwanted astigmatism. However a conventional PAL with a +2.50 D near optical power may have approximately +2.75 D or more of unwanted astigmatism while a conventional PAL with a +3.25 D near point optical power may have approximately +3.75 D or more of unwanted astigmatism. Thus, as a PAL's near distance add power increases (for example a +2.50 D PAL compared to a +1.00 D PAL), the unwanted astigmatism found within the PAL increases at a greater than linear rate with respect to the near distance add power.

More recently, a double-sided PAL has been developed which has a progressive addition surface topography placed on each side of the lens. The two progressive addition surfaces are aligned and rotated relative to one another to not only give the appropriate total additive near distance add power required, but also to have the unwanted astigmatism created by the PAL on one surface of the lens counteract some of the unwanted astigmatism created by the PAL on the other surface of the lens. Even though this design somewhat reduces the unwanted astigmatism and distortion for a given near distance add power as compared to traditional PAL lenses, the level of unwanted astigmatism, distortion and other vision compromises listed above still causes serious vision problems for the wearer.

Therefore, there is a pressing need to provide a spectacle lens and/or eyewear system that satisfies the vanity needs of presbyopic individuals and at the same time corrects their presbyopia in a manner that reduces distortion and blur, widens the horizontal viewing width, allows for improved safety, and allows for improved visual ability when playing sports, working on a computer, and reading a book or newspaper.

SUMMARY OF THE INVENTION

In an embodiment of the invention, an ophthalmic lens for a user having a fitting point may include a progressive addition region having a channel, wherein the progressive addition region has an add power therein. The ophthalmic lens may further include a dynamic optic in optical communication with the progressive addition region having an optical power when activated In an embodiment of the invention, an ophthalmic lens for a user having a fitting point may include a progressive addition region having a channel, wherein the progressive addition region has an add power therein. The ophthalmic lens may further include a dynamic optic in optical communication with the progressive addition region having an optical power when activated, wherein the dynamic optic has a top peripheral edge located within approximately 15 mm of the fitting point.

BRIEF DESCRIPTION OF THE DRAWINGS

A specific embodiment of the present invention will be described with reference to the following drawings, wherein:

FIG. 3A shows when the dynamic optic is deactivated, the optical power taken along a line of sight from a wearer's eye through the fitting point provides the wearer with correct far distance vision;

FIG. 3B shows when the dynamic optic is activated, the optical power taken along a line of sight from the wearer's eye through the fitting point provides the wearer with a correct intermediate distance focusing power;

FIG. 3C shows when the dynamic optic is activated, the optical power taken along a line of sight from the wearer's eye through the near distance viewing zone provides the wearer with a correct near distance focusing power;

FIG. 4D shows that the top and bottom distorted blend area of the dynamic electro-active optic are outside both the fitting point and the progressive addition reading area and channel;

DESCRIPTION OF THE PREFERRED EMBODIMENT

Figure 1A:
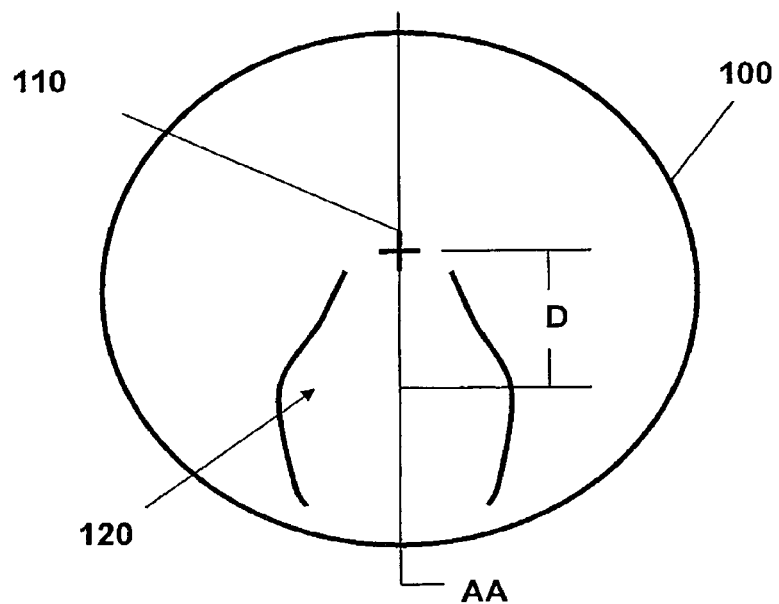
FIG. 1A shows an embodiment of a low add power Progressive Addition Lens having a fitting point and a progressive addition region.

Many ophthalmological, optometric, and optical terms are used in this application. For the sake of clarity, their definitions are listed below:

Add Power: The optical power added to the far distance viewing optical power which is required for clear near distance viewing in a multifocal lens. For example, if an individual has a far distance viewing prescription of −3.00 D with a +2.00 D add power for near distance viewing then the actual optical power in the near distance portion of the multifocal lens is −1.00 D. Add power is sometimes referred to as plus power. Add power may be further distinguished by referring to "near viewing distance add power" which refers to the add power in the near viewing distance portion of the lens and "intermediate viewing distance add power" which refers to the add power in the intermediate viewing distance portion of the lens. Typically, the intermediate viewing distance add power is approximately 50% of the near viewing distance add power. Thus, in the example above, the individual would have +1.00 D add power for intermediate distance viewing and the actual total optical power in the intermediate viewing distance portion of the multifocal lens is −2.00 D.

Approximately: Plus or minus 10 percent, inclusive. Thus, the phrase "approximately 10 mm" may be understood to mean from 9 mm to 11 mm, inclusive.

Blend Zone: An optical power transition along a peripheral edge of a lens whereby the optical power continuously transitions across the blend zone from a first corrective power to that of a second corrective power or vice versa. Generally the blend zone is designed to have as small a width as possible. A peripheral edge of a dynamic optic may include a blend zone so as to reduce the visibility of the dynamic optic. A blend zone is utilized for cosmetic enhancement reasons and also to enhance vision functionality. A blend zone is typically not considered a usable portion of the lens due to its high unwanted astigmatism. A blend zone is also known as a transition zone.

Channel: The region of a Progressive Addition Lens defined by increasing plus optical power which extends from the far distance optical power region or zone to the near distance optical power region or zone. This optical power progression starts in an area of the PAL known as the fitting point and ends in the near distance viewing zone. The channel is sometimes referred to as the corridor.

Channel Length: The channel length is the distance measured from the fitting point to the location in the channel where the add power is within approximately 85% of the specified near distance viewing power.

Channel Width: The narrowest portion of the channel bounded by an unwanted astigmatism that is above approximately +1.00 D This definition is useful when comparing PAL lenses due to the fact that a wider channel width generally correlates with less distortion, better visual performance, increased visual comfort, and easier adaptation for the wearer.

Contour Maps: Plots that are generated from measuring and plotting the unwanted astigmatic optical power of a Progressive Addition Lens. The contour plot can be generated with various sensitivities of astigmatic optical power thus providing a visual picture of where and to what extent a Progressive Addition Lens possesses unwanted astigmatism as part of its optical design. Analysis of such maps is typically used to quantify the channel length, channel width, reading width and far distance width of a PAL Contour maps may also be referred to as unwanted astigmatic power maps. These maps can also be used to measure and portray optical power in various parts of the lens.

Conventional Channel Length: Due to aesthetic concerns or trends in eyewear fashion, it may be desirable to have a lens that is foreshortened vertically. In such a lens the channel is naturally also shorter. Conventional channel length refers to the length of a channel in a non-foreshortened PAL lens. These channel lengths are usually, but not always, approximately 15 mm or longer. Generally, a longer channel length means a wider channel width and less unwanted astigmatism. Longer channel designs are often associated with "soft" progressives, since the transition between far distance correction and near distance correction is softer due to the more gradual increase in optical power.

Dynamic lens: A lens with an optical power which is alterable with the application of electrical energy, mechanical energy or force. Either the entire lens may have an alterable optical power, or only a portion, region or zone of the lens may have an alterable optical power. The optical power of such a lens is dynamic or tunable such that the optical power can be switched between two or more optical powers. One of the optical powers may be that of substantially no optical power Examples of dynamic lenses include electro-active lenses, meniscus lenses, fluid lenses, movable dynamic optics having one or more components, gas lenses, and membrane lenses having a member capable of being deformed. A dynamic lens may also be referred to as a dynamic optic, a dynamic optical element, a dynamic optical zone or a dynamic optical region Far Distance Reference Point: A reference point located approximately 3-4 mm above the fitting cross where the far distance prescription or far distance optical power of the lens can be measured easily.

Far Distance Viewing Zone: The portion of a lens containing an optical power which allows a user to see correctly at a far viewing distance.

Far Distance Width: The narrowest horizontal width within the far distance viewing portion of the lens which provides clear, mostly distortion-free correction with an optical power within 0.25 D of the wearer's far distance viewing optical power correction.

Far Viewing Distance: The distance to which one looks, by way of example only, when viewing beyond the edge of one's desk, when driving a car, when looking at a distant mountain, or when watching a movie. This distance is usually, but not always, considered to be approximately 32 inches or greater from the eye. The far viewing distance may also be referred to as a far distance and a far distance point.

Fitting Cross/Fitting Point: A reference point on a PAL that represents the approximate location of the wearer's pupil when looking straight ahead through the lens once the lens is mounted in an eyeglass frame and positioned on the wearer's face. The fitting cross/fitting point is usually, but not always, located 2-5 mm vertically above the start of the channel. The fitting cross typically has a very slight amount of plus optical power ranging from just over +0.00 Diopters to approximately +0.12 Diopters. This point or cross is marked on the lens surface such that it can provide an easy reference point for measuring and/or double-checking the fitting of the lens relative to the pupil of the wearer. The mark is easily removed upon the dispensing of the lens to the patient/wearer.

Hard Progressive Addition Lens: A Progressive Addition Lens with a less gradual, steeper transition between the far distance correction and the near distance correction. In a hard PAL the unwanted distortion may be below the fitting point and not spread out into the periphery of the lens. A hard PAL may also have a shorter channel length and a narrower channel width. A "modified hard Progressive Addition Lens" is a hard PAL which is modified to have a limited number of characteristics of a soft PAL such as a more gradual optical power transition, a longer channel, a wider channel, more unwanted astigmatism spread out into the periphery of the lens, and less unwanted astigmatism below the fitting point.

Intermediate Distance Viewing Zone: The portion of a lens containing an optical power which allows a user to see correctly at an intermediate viewing distance.

Intermediate Viewing Distance: The distance to which one looks, by way of example only, when reading a newspaper, when working on a computer, when washing dishes in a sink, or when ironing clothing. This distance is usually, but not always, considered to be between approximately 16 inches and approximately 32 inches flora the eye. The intermediate viewing distance may also be referred to as an intermediate distance and an intermediate distance point.

Lens: Any device or portion of a device that causes light to converge or diverge. The device may be static or dynamic. A lens may be refractive or diffractive. A lens may be either concave, convex or plano on one or both surfaces. A lens may be spherical, cylindrical, prismatic or a combination thereof. A lens may be made of optical glass, plastic or resin. A lens may also be referred to as an optical element, an optical zone, an optical region, an optical power region or an optic. It should be pointed out that within the optical industry a lens can be referred to as a lens even if it has zero optical power.

Lens Blank: A device made of optical material that may be shaped into a lens. A lens blank may be finished meaning that the lens blank has been shaped to have an optical power on both external surfaces. A lens blank may be semi-finished meaning that the lens blank has been shaped to have an optical power on only one external surface. A lens blank may be unfinished meaning that the lens blank has not been shaped to have an optical power on either external surface. A surface of an unfinished or semi-finished lens blank may be finished by means of a fabrication process known as free-forming or by more traditional surfacing and polishing.

Low Add Power PAL: A Progressive Addition Lens that has less than the necessary near add power for the wearer to see clearly at a near distance.

Multifocal Lens: A lens having more than one focal point or optical power. Such lenses may be static or dynamic. Examples of static multifocal lenses include a bifocal lens, trifocal lens or a Progressive Addition Lens. Examples of dynamic multifocal lenses include electro-active lenses whereby various optical powers may be created in the lens depending on the types of electrodes used, voltages applied to the electrodes and index of refraction altered within a thin layer of liquid crystal. Multifocal lenses may also be a combination of static and dynamic. For example, an electro-active element may be used in optical communication with a static spherical lens, static single vision lens, static multifocal lens such as, by way of example only, a Progressive Addition Lens. In most, but not all, cases, multifocal lenses are refractive lenses.

Near Distance Viewing Zone: The portion of a lens containing an optical power which allows a user to see correctly at a near viewing distance.

Near Viewing Distance: The distance to which one looks, by way of example only, when reading a book, when threading a needle, or when reading instructions on a pill bottle This distance is usually, but not always, considered to be between approximately 12 inches and approximately 16 inches from the eye. The near viewing distance may also be referred to as a near distance and a near distance point.

Office Lens/Office PAL: A specially designed Progressive Addition Lens that provides intermediate distance vision above the fitting cross, a wider channel width and also a wider reading width. This is accomplished by means of an optical design which spreads the unwanted astigmatism above the fitting cross and which replaces the far distance vision zone with that of a mostly intermediate distance vision zone. Because of these features, this type of PAL is well-suited for desk work, but one cannot drive his or her car or use it for walking around the office or home since the lens contains no far distance viewing area.

Ophthalmic Lens: A lens suitable for vision correction which includes a spectacle lens, a contact lens, an intra-ocular lens, a corneal in-lay, and a corneal on-lay.

Optical Communication: The condition whereby two or more optics of given optical power are aligned in a manner such that light passing through the aligned optics experiences a combined optical power equal to the sum of the optical powers of the individual elements.

Patterned Electrodes: Electrodes utilized in an electro-active lens such that with the application of appropriate voltages to the electrodes, the optical power created by the liquid crystal is created diffractively regardless of the size, shape, and arrangement of the electrodes For example, a diffractive optical effect can be dynamically produced within the liquid crystal by using concentric ring shaped electrodes.

Pixilated Electrodes: Electrodes utilized in an electro-active lens that are individually addressable regardless of the size, shape, and arrangement of the electrodes. Furthermore, because the electrodes are individually addressable, any arbitrary pattern of voltages may be applied to the electrodes. For example, pixilated electrodes may be squares or rectangles arranged in a Cartesian array or hexagons arranged in a hexagonal array. Pixilated electrodes need not be regular shapes that fit to a grid. For example, pixilated electrodes may be concentric rings if every ring is individually addressable. Concentric pixilated electrodes can be individually addressed to create a diffractive optical effect.

Progressive Addition Region: A region of a lens having a first optical power in a first portion of the region and a second optical power in a second portion of the region wherein a continuous change in optical power exists therebetween For example, a region of a lens may have a far viewing distance optical power at one end of the region. The optical power may continuously increase in plus power across the region, to an intermediate viewing distance optical power and then to a near viewing distance optical power at the opposite end of the region After the optical power has reached a near viewing distance optical power, the optical power may decrease in such a way that the optical power of this progressive addition region transitions back into the far viewing distance optical power. A progressive addition region may be on a surface of a lens or embedded within a lens When a progressive addition region is on the surface and comprises a surface topography it is known as a progressive addition surface.

Reading Width: The narrowest horizontal width within the near distance viewing portion of the lens which provides clear, mostly distortion free correction with an optical power within 0.25 D of the wearer's near distance viewing optical power correction.

Short Channel Length: Due to aesthetic concerns or trends in eyewear fashion, it may be desirable to have a lens that is foreshortened vertically. In such a lens the channel is naturally also shorter Short channel length refers to the length of a channel in a foreshortened PAL lens. These channel lengths are usually, but not always between approximately 11 mm and approximately 15 mm. Genet ally, a shorter channel length means a narrower channel width and more unwanted astigmatism. Shorter channel designs are often associated with "hard" progressives, since the transition between far distance correction and near distance correction is harder due to the steeper increase in optical power.

Soft Progressive Addition Lens: A Progressive Addition Lens with a more gradual transition between the far distance correction and the near distance correction. In a soft PAL the unwanted distortion may be above the fitting point and spread out into the periphery of the lens. A soft PAL may also have a longer channel length and a wider channel width. A "modified soft Progressive Addition Lens" is a soft PAL which is modified to have a limited number of characteristics of a hard PAL such as a steeper optical power transition, a shorter channel, a narrower channel, more unwanted astigmatism pushed into the viewing portion of the lens, and more unwanted astigmatism below the fitting point.

Static Lens: A lens having an optical power which is not alterable with the application of electrical energy, mechanical energy or force. Examples of static lenses include spherical lenses, cylindrical lenses, Progressive Addition Lenses, bifocals, and trifocals. A static lens may also be referred to as a fixed lens.

Unwanted Astigmatism: Unwanted aberrations, distortions or astigmatism found within a Progressive Addition Lens that are not part of the patient's prescribed vision correction, but rather are inherent in the optical design of a PAL due to the smooth gradient of optical power between the viewing zones. Although, a lens may have unwanted astigmatism across different areas of the lens of various dioptric powers, the unwanted astigmatism in the lens generally refers to the maximum unwanted astigmatism that is found in the lens. Unwanted astigmatism may also refer to the unwanted astigmatism located within a specific portion of a lens as opposed to the lens as a whole. In such a case qualifying language is used to indicate that only the unwanted astigmatism within the specific portion of the lens is being considered.

When describing dynamic lenses, the invention contemplates, by way of example only, electro-active lenses, fluid lenses, gas lenses, membrane lenses, and mechanical movable lenses, etc. Examples of such lenses can be found in Blum et al. U.S. Pat. Nos. 6,517,203, 6,491,394, 6,619,799, Epstein and Kurtin U.S. Pat. Nos. 7,008,054, 6,040,947, 5,668,620, 5,999,328, 5,956,183, 6,893,124, Silver U.S. Pat. Nos. 4,890,903, 6,069,742, 7,085,065, 6,188,525, 6,618,208, Stoner U.S. Pat. No. 5,182,585, and Quaglia U.S. Pat. No. 5,229,885.

It is well known and accepted within the optical industry that as long as the unwanted astigmatism and distortion of a lens is approximately 1.00 D or less, the user of the lens, in most cases, will barely notice it. The invention disclosed herein relates to embodiments of an optical design, lens, and eyewear system that solve many, if not most, of the problems associated with PALs. In addition, the invention disclosed herein significantly removes most of the vision compromises associated with PALs. The invention provides a means of achieving the proper far, intermediate and near distance optical powers for the wearer while providing continuous focusing ability for various distances, similar to that of a PAL. But the invention at the same time keeps the unwanted astigmatism to a maximum of approximately 1.50 D for certain high add power prescriptions such as a +3.00 D, +3.25 D and +3 50 D However, in most cases, the invention keeps the unwanted astigmatism to a maximum of approximately 1 00 D or less.

The invention is based upon aligning a low add power PAL with a dynamic lens such that the dynamic lens and the low add power PAL are in optical communication, whereby the dynamic lens provides the additional needed optical power for the wearer to see clearly at a near distance This combination leads to the unexpected result that not only does the wearer have the ability to see clearly at intermediate and near distances, but the level of unwanted astigmatism, distortion, and vision compromise are reduced significantly.

The dynamic lens may be an electro-active element. In an electro-active lens, an electro-active optic may be embedded within or attached to a surface of an optical substrate. The optical substrate may be a finished, semi-finished or unfinished lens blank. When a semi-finished or unfinished lens blank is used, the lens blank may be finished during manufacturing of the lens to have one or more optical powers. An electro-active optic may also be embedded within or attached to a surface of a conventional optical lens. The conventional optical lens may be a single focus lens or a multifocal lens such as a Progressive Addition Lens or a bifocal or trifocal lens The electro-active optic may be located in the entire viewing area of the electro-active lens or in just a portion thereof. The electro-active optic may be spaced from the peripheral edge of the optical substrate for edging the electro-active lens for spectacles. The electro-active element may be located near the top, middle or bottom portion of the lens. When substantially no voltage is applied, the electro-active optic may be in a deactivated state in which it provides substantially no optical power. In other words, when substantially no voltage is applied, the electro-active optic may have substantially the same refractive index as the optical substrate or conventional lens in which it is embedded or attached When voltage is applied, the electro-active optic may be in an activated state in which it provides optical add power. In other words, when voltage is applied, the electro-active optic may have a different refractive index than the optical substrate or conventional lens in which it is embedded or attached.

Electro-active lenses may be used to correct for conventional or non-conventional errors of the eye. The correction may be created by the electro-active element, the optical substrate or conventional optical lens or by a combination of the two. Conventional errors of the eye include low order aberrations such as near-sightedness, far-sightedness, presbyopia, and astigmatism. Non-conventional errors of the eye include higher-order aberrations that can be caused by ocular layer irregularities.

Liquid crystal may be used as a portion of the electro-active optic as the refractive index of a liquid crystal can be changed by generating an electric field across the liquid crystal. Such an electric field may be generated by applying one or more voltages to electrodes located on both sides of the liquid crystal. The electrodes may be substantially transparent and manufactured from substantially transparent conductive materials such as Indium Tin Oxide (ITO) or other such materials which are well-known in the art. Liquid crystal based electro-active optics may be particularly well suited for use as a portion of the electro-active optic since the liquid crystal can provide the required range of index change so as to provide optical add powers of plano to +3.00 D. This range of optical add powers may be capable of correcting presbyopia in the majority of patients A thin layer of liquid crystal (less than 10 μm) may be used to construct the electro-active optic. The thin layer of liquid crystal may be sandwiched between two transparent substrates. The two substrates may also be sealed along their peripheral edge such that the liquid crystal is sealed within the substrates in an substantially airtight manner. Layers of a transparent, conductive material may be deposited on the inner surfaces of the two, mostly planar, transparent substrates. The conductive material may then be used as electrodes. When a thin layer is employed, the shape and size of the electrode(s) may be used to induce certain optical effects within the lens. The required operating voltages to be applied to these electrodes for such thin layers of liquid crystal may be quite low, typically less than 5 volts. Electrodes may be patterned. For example, a diffractive optical effect can be dynamically produced within the liquid crystal by using concentric ring shaped electrodes deposited on at least one of the substrates. Such an optical effect can produce an optical add power based upon the radii of the rings, the widths of the rings, and the range of voltages separately applied to the different rings Electrodes may be pixilated. For example, pixilated electrodes may be squares or rectangles arranged in a Cartesian array or hexagons arranged in a hexagonal array. Such an array of pixilated electrodes may be used to generate optical add powers by emulating a diffractive, concentric ring electrode structure. Pixilated electrodes may also be used to correct for higher-order aberrations of the eye in a manner similar to that used for correcting atmospheric turbulence effects in ground-based astronomy.

Current manufacturing processes limit the minimum pixel size, and as such limit the maximum dynamic electro-active optic diameter. By way of example only, when using a concentric pixilated approach that creates a diffractive pattern the maximum dynamic electro-active optic diameters are estimated to be 20 mm for +1.50 D, 24 mm for +1.25 D, and 30 mm for +1.50 D Current manufacturing processes limit the maximum dynamic electro-active optic diameter when using a pixilated diffractive approach. As such, embodiments of the invention can possess dynamic electro-active optics with smaller optical powers at much larger diameters.

Alternately, the electro-active optic is comprised of two transparent substrates and a layer of liquid crystal, where the first substrate is mostly planar and coated with a transparent, conductive layer while the second substrates has a patterned surface that is of a surface relief diffractive pattern and is also coated with a transparent, conductive layer. A surface relief diffractive optic is a physical substrate which has a diffractive grating etched or created thereon. Surface relief diffractive patterns can be created by way of diamond turning, injection molding, casting, thermoforming, and stamping. Such an optic may be designed to have a fixed optical power and/or aberration correction. By applying voltage to the liquid crystal through the electrode, the optical power/aberration correction can be switched on and off by means of refractive index mismatching and matching, respectively. When substantially no voltage is applied, the liquid crystal may have substantially the same refractive index as the surface relief diffractive optic. This cancels out the optical power that would normally be provided by the surface relief diffractive element. When voltage is applied, the liquid crystal may have a different refractive index than the surface relief diffractive element such that the surface relief diffractive element now provides optical add power. By using a surface relief diffractive pattern approach dynamic electro-active optics having a large diameter or horizontal width can be made. The widths of these optics can be made up to or greater than 40 mm.

A thicker layer of liquid crystal (typically >50 μm) may also be used to construct the electro-active multifocal optic. For example, a modal lens may be employed to create a refractive optic Known in the art, modal lenses incorporate a single, continuous low conductivity circular electrode surrounded by, and in electrical contact with, a single high conductivity ring-shaped electrode. Upon application of a single voltage to the high conductivity ring electrode, the low conductivity electrode, essentially a radially symmetric, electrically resistive network, produces a voltage gradient across the layer of liquid crystal, which subsequently induces a refractive index gradient in the liquid crystal. A layer of liquid crystal with a refractive index gradient will function as an electro-active lens and will focus light incident upon it.

In an embodiment of the invention, a dynamic optic is used in combination with a Progressive Addition Lens to form a combined lens. The Progressive Addition Lens may be a low add power Progressive Addition Lens. The Progressive Addition Lens comprises a progressive addition region. The dynamic optic may be located such that it is in optical communication with the progressive addition region. The dynamic optic is spaced apart flora the progressive addition region, but is in optical communication therewith.

In an embodiment of the invention, the progressive addition region may have an add powers of one of: +0.50 D, +0.75 D, +1.00 D, +1.12 D, +1.25 D, +1.37 D, and +1.50 D. In an embodiment of the invention, the dynamic optic may have an optical power of one of: +0.50 D, +0.75 D, +1.00 D, +1.12 D, +1.25 D, +1.37 D, +1.50 D, +1.62 D, +1.75 D, +2.00 D, and +2.25 D in an activated state. The add power of the progressive addition region and the optical power of the dynamic optic may be manufactured or prescribed to a patient in either +0.125 D (which is rounded to either +0.12 D or +0.13 D) steps or in +0.25 D steps.

It should be pointed out that the invention contemplates any and all possible power combinations, both static and dynamic, needed to correct the wearer's vision properly at far, intermediate and neat viewing distances The inventive examples and embodiments provided within this disclosure are merely illustrative and are not intended to be limiting in any way Rather they are intended to show additive optical power relationships when a low add power progressive addition region is in optical communication with a dynamic optic.

The dynamic optic may have a blend zone such that the optical power along the element's peripheral edge is blended so as to reduce the visibility of the peripheral edge when the element is activated In most, but not all cases, the dynamic optic's optical power may transition in the blend zone from a maximum optical power contributed by the dynamic optic when activated to an optical power found in the Progressive Addition Lens. In an embodiment of the invention, the blend zone may be 1 mm-4 mm in width along the peripheral edge of the dynamic optic. In another embodiment of the invention, the blend zone may be 1 mm-2 mm in width along the peripheral edge of the dynamic optic.

When the dynamic optic is deactivated, the dynamic optic will provide substantially no optical add power. Thus, when the dynamic optic is deactivated, the Progressive Addition Lens may provide all of the add power for the combined lens (i.e. the total add power of the combined optic is equal to the add power of the PAL). If a dynamic optic includes a blend zone, in the deactivated state the blend zone contributes substantially no optical power and substantially no unwanted astigmatism due to refractive index matching in the deactivated state. In an embodiment of the invention, when the dynamic optic is deactivated, the total unwanted astigmatism within the combined lens is substantially equal to that contributed by the Progressive Addition Lens In an embodiment of the invention, when the dynamic optic is deactivated, the total add power of the combined optic may be approximately +1.00 D and the total unwanted astigmatism within the combined lens may be approximately 1.00 D or less. In another embodiment of the invention, when the dynamic optic is deactivated, the total add power of the combined optic may be approximately +1.25 D and the total unwanted astigmatism within the combined lens may be approximately 1.25 D or less hi another embodiment of the invention, when the dynamic optic is deactivated, the total add power of the combined optic may be approximately +1.50 D and the total unwanted astigmatism within the combined lens may be approximately 1.50 D or less.

When the dynamic optic is activated, the dynamic optic will provide additional optical power Since the dynamic optic is in optical communication with the Progressive Addition Lens, the total add power of the combined optic is equal to the add power of the PAL and the additive optical power of the dynamic optic. If a dynamic optic includes a blend zone, in the activated state the blend zone contributes optical power and unwanted astigmatism due to refractive index mismatching in the activated state and is largely not usable for vision focus. Thus, when the dynamic optic includes a blend zone, the unwanted astigmatism of the combined optic is measured only within the usable portion of the dynamic optic which does not include the blend zone. In an embodiment of the invention, when the dynamic optic is activated, the total unwanted astigmatism within the combined lens as measured through the usable portion of the lens may be substantially equal to the unwanted astigmatism within the Progressive Addition Lens. In an embodiment of the invention, when the dynamic optic is activated and the total add power of the combined optic is between approximately +0.75 D and approximately +2.25 D, the total unwanted astigmatism within the usable portion of the combined lens may be 1.00 D or less. In another embodiment of the invention, when the dynamic optic is activated and the total add power of the combined optic is between approximately +2.50 D and approximately +2.75 D, the total unwanted astigmatism within the usable portion of the combined lens may be 1.25 D or less. In another embodiment of the invention, when the dynamic optic is activated and the total add power of the combined optic is between approximately +3.00 D and approximately +3.50 D, the total unwanted astigmatism within the usable portion of the combined lens may be 1.50 D or less. Thus, the invention allows for the creation of a lens with a total add power significantly higher than the lens's unwanted astigmatism as measured through the usable portion of the lens Or said another way, for a given total add power of the inventive combined lens, the degree of unwanted astigmatism is reduced substantially. This is a significant degree of improvement as to what is taught in the literature or what is commercially available. This improvement translates into a higher adaptation rate, less distortion, less tripping or disorientation of the wearer and a much wider clear field of view for intermediate and near distance viewing by the wearer.

In an embodiment of the invention the dynamic optic may contribute between approximately 30% and approximately 70% of the total add power required for a user's neat distance vision prescription. The progressive addition region of the low add power PAL may contribute the remainder of the add power required for a user's near distance vision prescription, namely, between approximately 70% and approximately 30%, respectively. In another embodiment of the invention, the dynamic optic and the progressive addition region may each contribute approximately 50% of the total add power required for a user's near distance vision prescription. If the dynamic optic contributes too much of the total add power, when the dynamic lens is deactivated the user may not be able to see clearly at an intermediate distance Additionally, when the dynamic optic is activated, the user may have too much optical power in the intermediate distance viewing zone and as such may not be able to see clearly at an intermediate distance. If the dynamic optic contributes too little of the total add power, the combined lens may have too much unwanted astigmatism When the dynamic optic includes a blend zone, it may be necessary for the dynamic optic to be wide enough to ensure that at least a portion of the blend zone is located in the periphery of the combined optic. In an embodiment of the invention, the horizontal width of the dynamic optic may be approximately 26 mm or greater. In another embodiment of the invention, the horizontal width of the dynamic optic may be between approximately 24 mm and approximately 40 mm. In another embodiment of the invention, the horizontal width of the dynamic optic is between approximately 30 mm and approximately 34 mm. If the dynamic optic is less than approximately 24 mm in width, it is possible that the blend zone may interfere with a user's vision and create too much distortion and swim for the user when the dynamic optic is activated. If the dynamic optic is greater than approximately 40 mm in width, it may be difficult to edge the combined lens into the shape of an eyeglass frame. In most, but not all cases, when the dynamic optic is located with its blend zone at or below the fitting point of the combined lens, the dynamic optic may have an oval shape with a horizontal width dimension larger than its vertical height dimension. When the dynamic optic is located with its blend zone above the fitting point the dynamic optic is usually, but not always, located such that a top peripheral edge of the dynamic optic is a minimum of 8 mm above the fitting point. It should be noted that dynamic optics that are not electro-active may be placed to the peripheral edge of the combined lens. Additionally, such non-electro-active dynamic optics may be less than 24 mm wide.

In an embodiment of the invention, the dynamic optic is located at or above the fitting point. A top peripheral edge of the dynamic optic may be between approximately 0 mm and 15 mm above the fitting point. The dynamic optic is able to provide, when activated, the needed optical power when the wearer is looking at an intermediate distance, a near distance or somewhere between the intermediate and near distance (neat-intermediate distance). This results from the dynamic optic being located at or above the fitting point. This will allow the user to have a correct intermediate distance prescription when looking straight ahead Additionally, because of the progressive addition region, the optical power continuously increases from the fitting point downward through the channel the user will have a correct near-intermediate distance and near distance prescription correction when looking through the channel. Thus, the user may, in many circumstances, not need to look downward as fat or have to raise their chin as far to see through the intermediate distance viewing zone of the lens. If the dynamic optic is spaced vertically from the top of the combined lens, the user may also be able to see at a far distance by utilizing a portion of the combined lens above the activated dynamic optic. When the dynamic optic is deactivated, the area of the lens at or near the fitting point will return to the far distance optical power of the lens.

In embodiments in which the dynamic optic has a blend zone, it may be preferable to locate the dynamic optic above the fitting point. In such an embodiment, when the dynamic optic is activated, a user may look straight ahead through the fitting point and downward through the channel without looking through the blend zone. As mentioned above, the blend zone may introduce a high degree of unwanted astigmatism which may be uncomfortable to look through. Thus, the user may make use of the combined optic in the activated state without experiencing a high degree of unwanted astigmatism as the user will not have to pass over the edge or blend zone of the dynamic optic.

In an embodiment of the invention, the dynamic optic is located below the fitting point. A top peripheral edge of the dynamic optic may be between approximately 0 mm and 15 mm below the fitting point. When the user looks straight ahead through the fitting point, a far distance prescription correction is provided by the combined optic as the dynamic optic is not in optical communication with this portion of the combined lens. However, when the user shifts his or her gaze from the fitting point downward through the channel, the user may experience a high degree of unwanted astigmatism as the user's eyes pass over the blend zone of the dynamic optic. This may be rectified in a variety of ways which are detailed below.

The inventive combined ophthalmic lens comprises an optical design that takes into consideration:
1) The total near distance add power required of the inventive ophthalmic lens to satisfy the near vision correction of a wearer;
2) The level of unwanted astigmatism or distortion in the usable portion of the combined lens;
3) The amount of optical add power contributed in part by the progressive addition region;
4) The amount of optical power contributed by the dynamic optic when activated;
5) The channel length of the progressive addition region;
6) The design of the progressive addition region in terms of whether it is, by way of example only, a soft PAL design, a hard PAL design, a modified soft PAL design or a modified hard PAL design;
7) The width and height of the dynamic optic; and
8) The location of the dynamic optic with respect to the progressive addition region.

FIG. 1A shows an embodiment of a Progressive Addition Lens 100 having a fitting point 110 and a progressive addition region 120. The Progressive Addition Lens in FIG. 1A is a low add power Progressive Addition Lens designed to provide a wearer with a desired optical power less than the wearer's needed near distance optical power correction. For example, the add power of the PAL may be 50% of the near distance optical power correction. The distance along axis line AA of the lens from the fitting point to the point on the lens where the optical power is within 85% of the desired add optical power is known as the channel length. The channel length is designated in FIG. 1A as distance D. The value of distance D may be varied depending upon many factors, such as the style of flame the lens will be edged to fit, how much optical power is required, and how wide a channel width is required. In an embodiment of the invention, the distance D is between approximately 11 mm and approximately 20 mm. In another embodiment of the invention the distance D is between approximately 14 mm and approximately 18 mm.

Figure 1B:
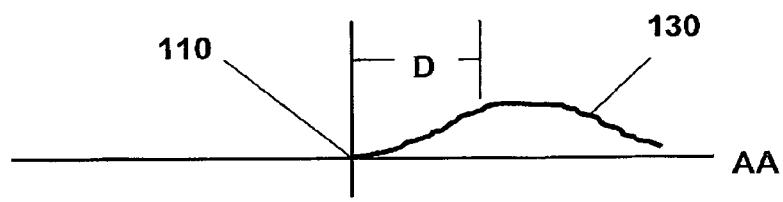
FIG. 1B shows a graph of optical power 130 taken along a cross section of the lens of FIG. 1A, along axis line AA.

FIG. 1B shows a graph of optical power 130 taken along a cross section of the lens of FIG. 1A, along axis line AA. The x-axis of the graph represents distance along axis line AA in the lens. The y-axis of the graph represents the amount of optical power within the lens. The optical power shown in the graph begins at the fitting point. The optical power before or at the fitting point may be approximately +0.00 D to approximately +0.12 D (i.e., approximately no optical power) or may have a positive or negative dioptric power depending on the far distance prescriptive needs of a user. FIG. 1B shows the lens as having no optical power before or at the fitting point. After the fitting point, the optical power continuously increases to a maximum power. The maximum power may persist for some length of the lens along axis line AA. FIG. 1B shows the maximum power persisting, which appears as a plateau of optical power. FIG. 1B also shows that the distance D occurs before the maximum power. After the maximum power plateau, the optical power may then continuously decrease until a desired optical power. The desired optical power may be any power less than the maximum power and may be equal to the optical power at the fitting point. FIG. 1B shows the optical power continuously decreasing after the maximum power.

In an embodiment of the invention, the progressive addition region may be a progressive addition surface located on the front surface of the lens and the dynamic optic may be buried inside the lens. In another embodiment of the invention, the progressive addition region may be a progressive addition surface located on the back surface of the lens and the dynamic optic may be buried inside the lens. In another embodiment of the invention, the progressive addition region may be two progressive addition surfaces with one surface located on the front surface of the lens and the second surface located on the back surface of the lens (as that of a dual surface Progressive Addition Lens) and the dynamic optic may be buried inside the lens. In still other inventive embodiments, the progressive addition region may not be produced by a geometric surface, but instead may be produced by a refractive index gradient Such an embodiment would allow both surfaces of the lens to be similar to surfaces used on single focus lenses. Such a refractive index gradient providing a progressive addition region may be located inside the lens or on a surface of the lens.

One important advantage of the present invention, as described above, is that even when the dynamic optic is in a deactivated state, the wearer will always have the correct intermediate distance and fat distance vision optical power. Therefore, the only control mechanism that may be required is a means for selectively activating the dynamic optic when a proper neat distance optical power is needed for the wearer. This effect is provided by the low add power PAL having an add power that provides less optical power at a near distance than a user's prescriptive near distance needs, and further that this lower add power approximates the correct prescriptive optical power for the wearer's intermediate distance viewing needs When the dynamic optic is activated, the wearer's neat distance optical power focusing needs will be satisfied.

This may greatly simplify the sensor suite required to control the lens. In fact, all that may be required is a sensing device that can detect if a user is focusing beyond an intermediate distance. If the user is focusing closet than a fat distance, the dynamic optic may be activated. If the user is not focusing closer than a fat distance, the dynamic optic may be deactivated. Such a device may be a simple tilt switch, a manual switch, or a range finder.

In embodiments of the invention, a small amount of temporal delay may be placed in the control system so that the patient's eye passes past the point of the peripheral edge of the dynamic optic before the dynamic optic is activated. This allows the wearer to avoid any unpleasant unwanted distortion effects that might be caused by looking through the peripheral edge of the dynamic optic. Such an embodiment may be beneficial when the dynamic optic includes a blend zone. By way of example only, when a line of sight of the wearer is to move from viewing a far distance object to a near distance object, the wearer's eye will translate over the peripheral edge of the dynamic optic into the near distance viewing zone In such a case, the dynamic optic will not be activated until the wearer's line of sight has already transitioned past the peripheral edge of the dynamic optic and into the near distance viewing zone. This occurs by delaying the time to activate the dynamic optic in order to allow the line of sight of the wearer to pass over the peripheral edge. If the activation of the dynamic optic was not temporally delayed and was instead activated before the wearer's line of sight transitioned over the peripheral edge, the wearer might experience a high degree of unwanted astigmatism while looking through the peripheral edge. This inventive embodiment may be utilized mostly when the dynamic optic's peripheral edge is located at or below the fitting point of the combined lens. In other inventive embodiments the dynamic optic's peripheral edge may be located above the fitting point of the combined lens and thus, in most cases, the delay may not be needed as the line of sight of the wearer never passes over the peripheral edge of the dynamic optic when looking between an intermediate distance and a near distance.

In still other inventive embodiments, the Progressive Addition Lens and the blend zone of the dynamic optic may be designed such that in the area where the two overlap the unwanted astigmatism in the blend zone at least partially cancels out some of the unwanted astigmatism in the PAL. This effect is comparable to a dual-sided PAL in which one surface's unwanted astigmatism is designed to cancel out some of the other surface's unwanted astigmatism.

Figure 2A:
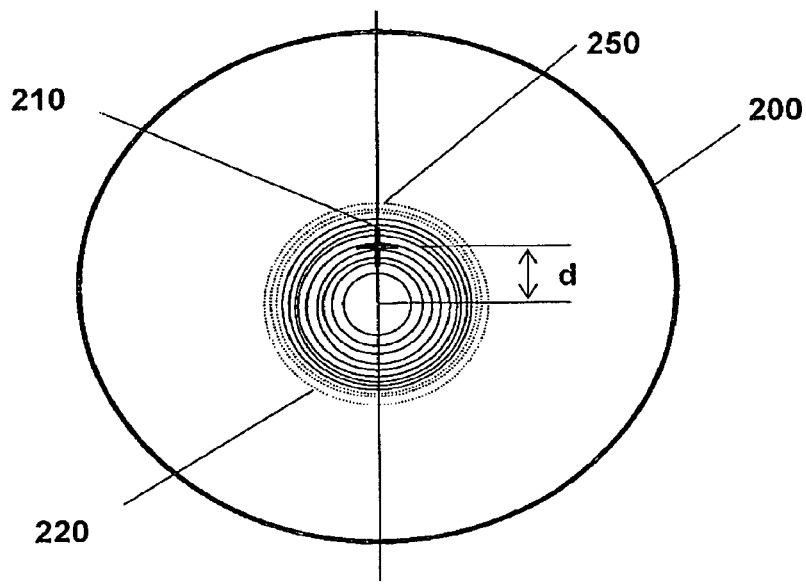
FIG. 2A shows an embodiment of the invention having a low add power Progressive Addition Lens combined with a much larger dynamic optic placed such that a portion of the dynamic optic lies above a fitting point of the lens.
Figure 2B:
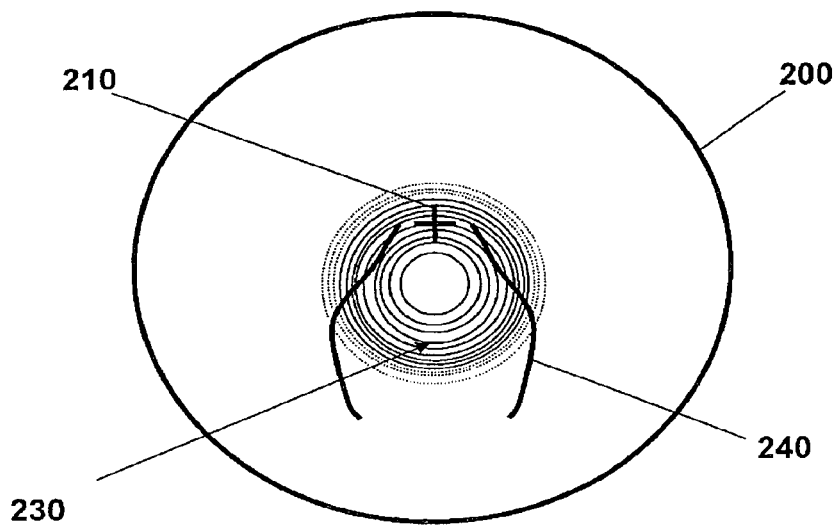
FIG. 2B shows the combined lens of FIG. 2A having a combined optical power that is created because the dynamic optic is in optical communication with a progressive addition region.

In an embodiment of the invention, it may be desirable to increase the size of a dynamic optic and locate the dynamic optic so that a top peripheral edge of the dynamic optic is above a fitting point of the lens. FIG. 2A shows an embodiment of a low add power Progressive Addition Lens 200 combined with a much larger dynamic optic 220 placed such that a top peripheral edge 250 of the dynamic optic lies above the fitting point 210 of the lens. In an embodiment of the invention, the diameter of the larger dynamic optic is between approximately 24 mm and approximately 40 mm. The vertical displacement of the dynamic optic relative to the fitting point of the lens is designated by the distance d. In an embodiment of the invention, distance d is in a range of approximately 0 mm to a distance equal to approximately one half the diameter of the dynamic optic. In another embodiment of the invention, the distance d is a distance between approximately one eighth the diameter of the dynamic optic and three eighths the diameter of the dynamic optic FIG. 2B shows an embodiment having a combined optical power 230 that is created because the dynamic optic is in optical communication with a progressive addition region 240. The lens 200 may have a reduced channel length In an embodiment of the invention, the channel length is between approximately 11 mm and approximately 20 mm. In another embodiment of the invention, the channel length is between approximately 14 mm and approximately 18 mm.

In the inventive embodiments illustrated in FIGS. 2A and 2B, when the dynamic optic is activated, because the lens is a low add power PAL and the dynamic optic is located above the fitting point, the wearer has correct intermediate distance vision while looking straight ahead. The wearer also has correct near-intermediate distance as the wearer's eye moves down the channel. Finally, the wearer has correct near distance vision within the area of the combined lens where the power of the dynamic optic and the progressive addition region combine to form the required near viewing distance correction. This is an advantageous method of combining the dynamic optic with the progressive addition region, since computer use is largely an intermediate viewing distance task and is one in which many people view the computer screen in a straight ahead or very slightly downward viewing posture. In the deactivated state, the area of the lens above and near the fitting point allows for distance vision viewing correction with a weak progressive power below the fitting point. The maximum optical power of the progressive addition region contributes approximately one half the required near distance optical power for a wearer and the dynamic optic contributes the remainder of the optical power needed for clear near distance vision.

Figure 3A:
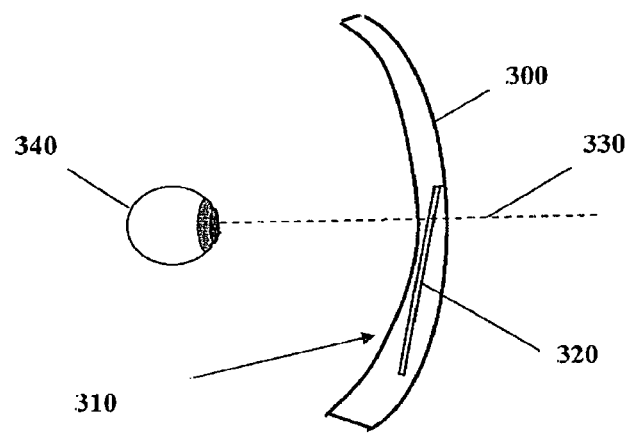
FIG. 3A shows an embodiment of the invention having a low add power Progressive Addition Lens and a dynamic optic placed such that a portion of the dynamic optic lies above a fitting point of the lens.
Figure 3B:
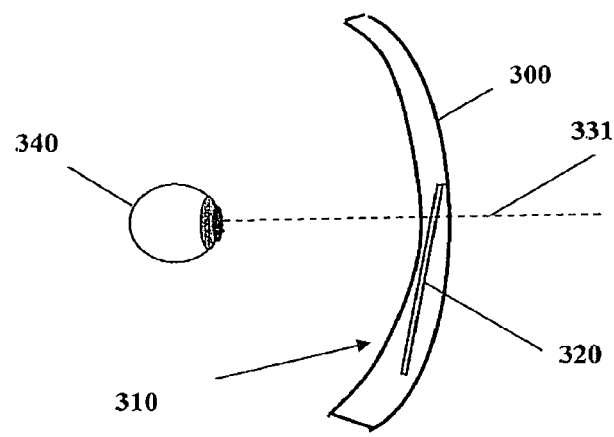
FIG. 3B shows the lens of FIG. 3A
Figure 3C:
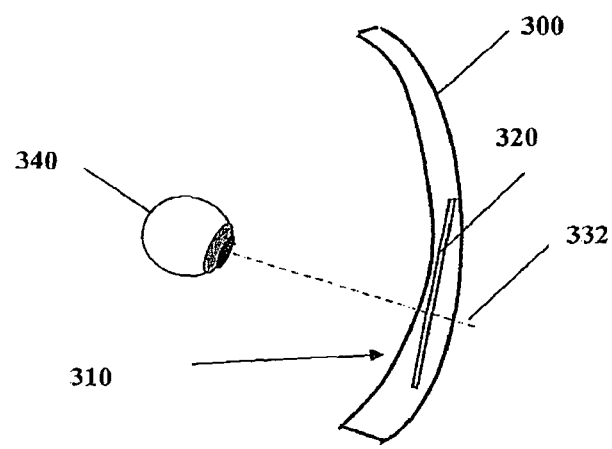
FIG. 3C shows the lens of FIG. 3A.

FIGS. 3A-3C illustrate an embodiment of the invention, in which the dynamic optic 320 is placed within the lens 300, and the progressive addition region 310 is placed on the back surface of the lens. This back progressive addition surface can be placed on the lens during the processing of a semi-finished lens blank having an integrated dynamic optic by means of a fabrication approach known as free forming. In another embodiment of the invention, the progressive addition region is located on the front surface of the semi-finished lens blank The semi-finished lens blank incorporates the dynamic optic such that the dynamic optic is in proper alignment with the progressive addition surface curvature. The semi-finished lens blank is then processed by conventional surfacing, polishing, edging, and mounting into an eyeglass frame.

As illustrated in FIG. 3A, when the dynamic optic is deactivated, the optical power taken along a line of sight from a wearer's eye 340 through the fitting point provides the wearer with correct far distance vision 330. As illustrated in FIG. 3B, when the dynamic optic is activated, the optical power taken along a line of sight from the wearer's eye through the fitting point provides the wearer with a correct intermediate distance focusing power 331. As the wearer moves his or her gaze down the channel as shown in FIGS. 3B-3C, the combined optics of the dynamic optic and the progressive addition surface provides a mostly continuous power transition from intermediate distance focus to near distance focus. Thus, as illustrated in FIG. 3C, when the dynamic optic is activated, the optical power taken along a line of sight from the wearer's eye through the near distance viewing zone provides the wearer with a correct near distance focusing power 332. One major advantage of this embodiment of the invention may be that the control system only needs to decide if the wearer is looking to a far distance. In such a case of distance viewing the dynamic optic may remain in the deactivated state. In embodiments where a range finding device is used, the ranging system only needs to decide if an object is closer to the eye than one's intermediate distance. In such a case the dynamic optic would be activated to provide a combined optical power allowing for simultaneous intermediate distance and near distance optical power correction. Another major advantage of this embodiment of the invention is that the eye does not have to pass over or cross the upper edge of the dynamic optic when it is turned on such as when a user looks from a far distance portion of the lens to a near distance portion of the lens and vice versa If the dynamic optic has its upper most edge located below the fitting point the eye must pass over or cross this upper edge when looking from far distance to near distance or from near distance to far distance. However, embodiments of the invention may allow the positioning of the dynamic optic below the fitting point such that the eye does not pass over the upper most edge of the dynamic optic. Such embodiments may allow for other advantages with regard to visual performance and ergonomics.

While FIGS. 3A-3C illustrate the progressive addition surface region on the back surface, it may also be placed on the front surface of the lens or located on both the front and back surfaces of the lens while the dynamic optic may be located within the lens. Additionally, while the dynamic optic is illustrated as located inside the lens, it may also be placed on the surface of the lens if it were made from curved substrates and covered by an ophthalmic covering material. By using one dynamic optic having a known optical power in combination with different PAL lenses each having a different add power, it may be possible to reduce the number of dynamic optic semi-finished blank SKU's substantially. For example a +0.75 D dynamic optic could be combined with a +0.50 D, +0.75 D or +1.00 D progressive addition region or surface, to produce add power's of +1 25 D, +1.50 D or +1.75 D respectively. Or a +1.00 D dynamic optic could be combined with a +0.75 D or +1.00 D, progressive addition region or surface, to produce add powers of +1.75 or +2.00 D Moreover the progressive addition region can be optimized to account for characteristics of the wearer, such as the patient's far distance power, and eye path through the lens, as well as the fact that the progressive addition region is being added to an dynamic electro-active optic that is providing approximately half the required reading correction. Likewise the reverse also works well. For example, a +1.00 D progressive addition region or surface may be combined with a +0.75 D, +1.00 D, +1.25 D or +1.50 D dynamic optic to produce a combined add power of +1.75 D, +2.00 D, +2.25 D or +2 50 D.

Figure 4A:
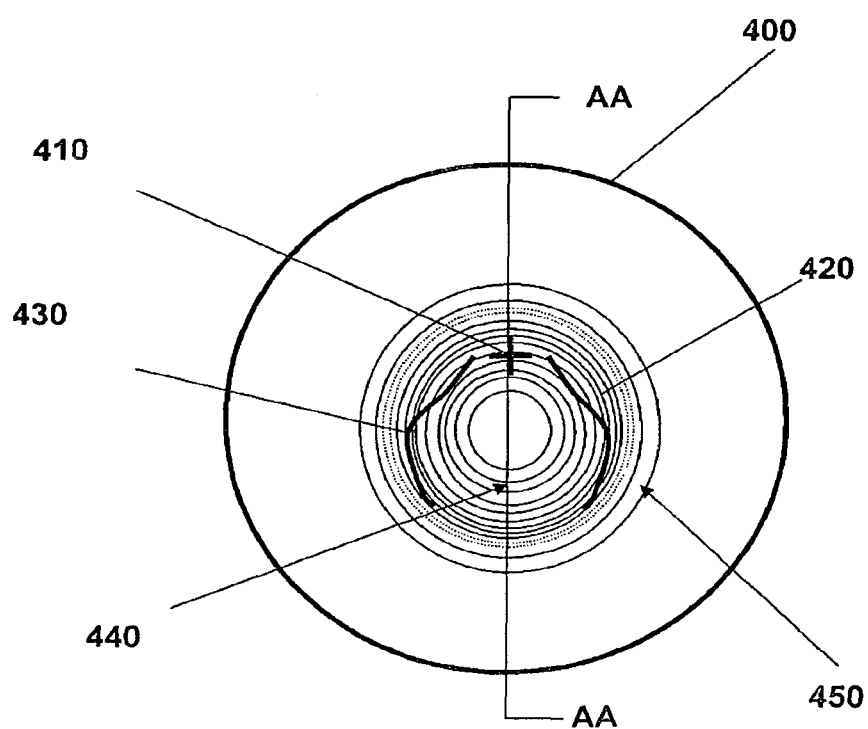
FIG. 4A shows an embodiment of the invention having a low add power Progressive Addition Lens combined with a dynamic optic that is larger than a progressive addition region and/or channel and located above a fitting point of the lens.
Figure 4B:
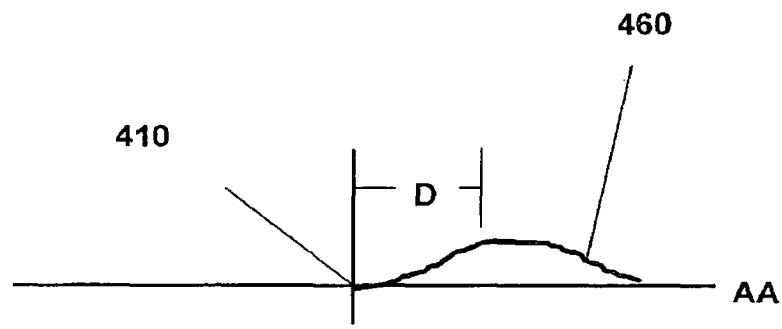
FIG. 4B shows the optical power that is provided by the fixed progressive addition surface or region taken along axis line AA of FIG. 4A.
Figure 4C:
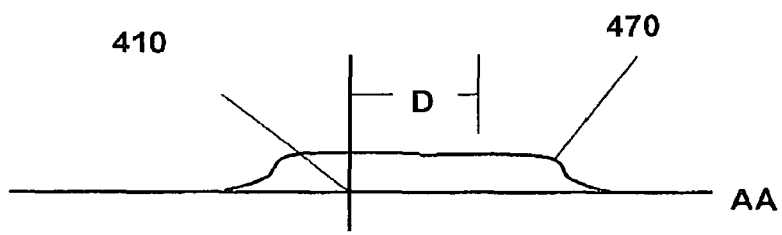
FIG. 4C shows the optical power that is provided by the dynamic optic when activated taken along axis line AA of FIG. 4A.
Figure 4D:
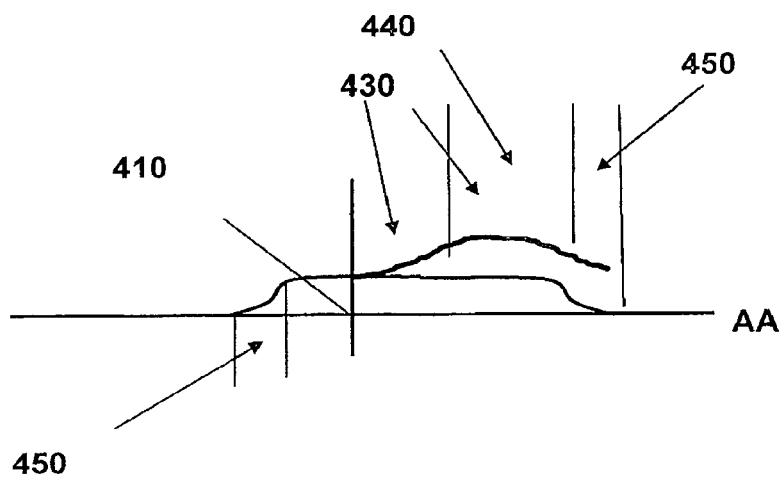
FIG. 4D shows the combined powers of the dynamic electro-active optic and the fixed progressive addition region taken along axis line AA of FIG. 4A.

FIG. 4A illustrates another embodiment of the invention whereby a low add power Progressive Addition Lens 400 is combined with a dynamic optic 420 that is larger than the progressive addition region and/or channel 430. In this embodiment, the unwanted distortion 450 from the blend zone of the dynamic optic is well outside both the fitting point 410 and the progressive addition channel 430 and reading zones 440. FIGS. 4B-4D show graphs of optical power taken along a cross section of the lens of FIG. 4A, along axis line AA. The x-axis of each graph represents distance along axis line AA in the lens. The y-axis of each graph represents the amount of optical power within the lens. The optical power before or at the fitting point may be approximately +0.00 D to approximately +0 12 D (i.e., approximately no optical power) or may have a positive or negative dioptric power depending on the far distance prescriptive needs of a user FIG. 4B shows the lens as having no optical power before or at the fitting point. FIG. 4B shows the optical power 460 that is provided by the fixed progressive addition surface or region taken along axis line AA of FIG. 4A. FIG. 4C shows the optical power 470 that is provided by the dynamic optic when activated taken along axis line AA of FIG. 4A. Finally, FIG. 4D shows the combined power's of the dynamic electro-active optic and the fixed progressive addition region taken along axis line AA of FIG. 4A. From the figure it is clear that the top and bottom distorted blend area 450 of the dynamic electro-active optic are outside both the fitting point 410 and the progressive addition reading area 440 and channel 430.

Figure 5A:
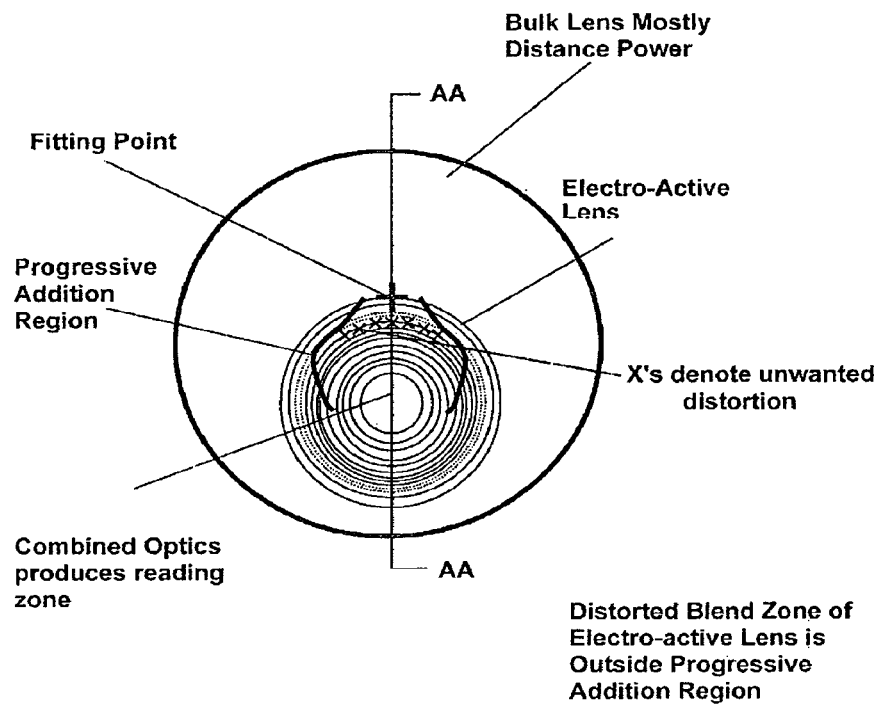
FIG. 5A shows an embodiment of the invention in which a dynamic optic is located below a fitting point of a low add power Progressive Addition Lens.
Figure 5B:
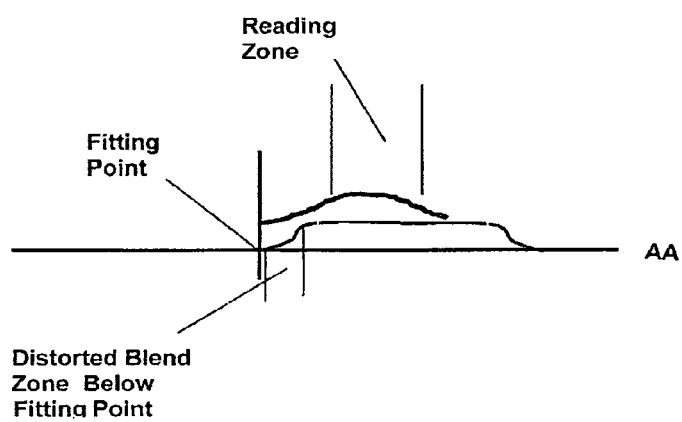
FIG. 5B shows optical power taken along axis line AA of FIG. 5A.

FIGS. 5A and 5B are illustrative of embodiments in which a dynamic optic 520 is located below a fitting point 510 of a low add power Progressive Addition Lens 500. In FIG. 5A, the location of the blend zone of the dynamic electro-active optic results in significant overall distortion 550 as the wearer's eye tracks down the progressive corridor 530. In certain inventive embodiments of the invention this is solved by delaying the activation of the dynamic optic until the wearer's eye has passed over the upper edge of the blend zone of the dynamic optic. FIG. 5B shows optical power along axis line AA of FIG. 5A. The region of distortion 550 is seen to overlap with the add power of the lens just below the fitting point and further shows the need to delay the activation of the dynamic optic until the eye passes over this area Once the eye passes over this area and enters, for example, the reading zone 540 there is no longer significant optical distortion. In an embodiment of the invention, a very narrow blend zone of 1 mm-2 mm may be provided to allow for the eye to quickly pass over this area. In an embodiment of the invention, a horizontal width of the dynamic optic may be between approximately 24 mm and approximately 40 mm. In another embodiment of the invention, a horizontal width of the dynamic optic may be between approximately 30 mm and approximately 34 mm. In another embodiment of the invention, a horizontal width of the dynamic optic may be approximately 32 mm. Thus, in certain inventive embodiments the dynamic optic is shaped more like an oval with the horizontal measurement being wider than the vertical measurement.

Figure 6A:
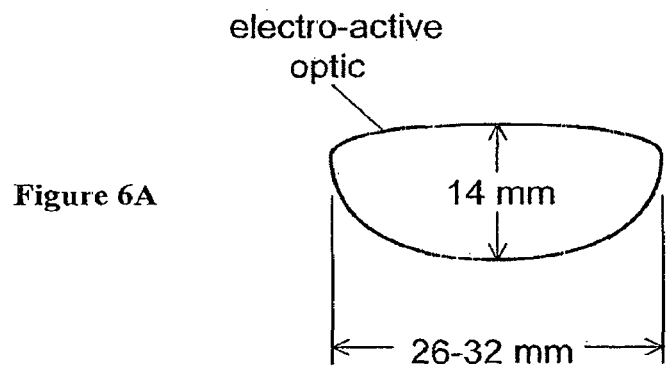
FIGS. 6A-6C show various embodiments of the size of the dynamic optic.
Figure 6B:
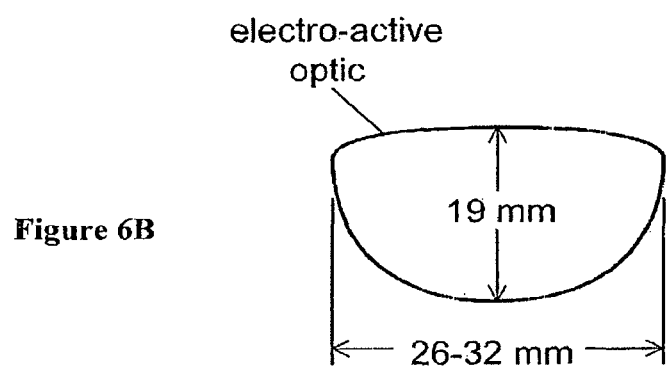
Figure 6C:
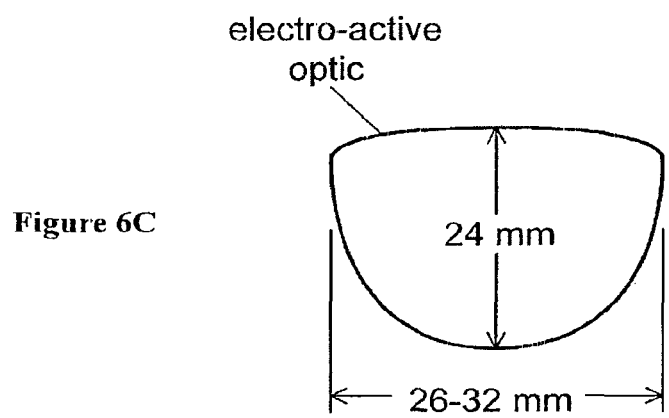

FIGS. 6A-6C show embodiments of a dynamic optic In the embodiments shown, the dynamic optic has an oval shape and is between approximately 26 mm and approximately 32 mm wide. Various heights of the dynamic optic are shown. FIG. 6A shows a dynamic optic with a height of approximately 14 mm. FIG. 6B shows a dynamic optic with a height of approximately 19 mm. FIG. 6C shows a dynamic optic with a height of approximately 24 mm.

FIGS. 7A-7K show unwanted astigmatic contour maps comparing an existing state-of-the-art Progressive Addition Lens and embodiments of the invention which include a low add power Progressive Addition Lens and a dynamic optic. The unwanted astigmatic power maps were measured and generated by a Visionix State of the Art Power MapVM 2000™ "High Precision Lens Analyzer" which is the same equipment used by lens manufacturers when fabricating or designing PALs to measure and inspect their own PALs for both quality control and marketing specification purposes. Embodiments of the invention are simulated using the low add power PAL and a spherical lens. The spherical lens has an optical power equal to that of an activated dynamic optic of a given optical power which extends to the periphery of the lens.

Figure 7A:
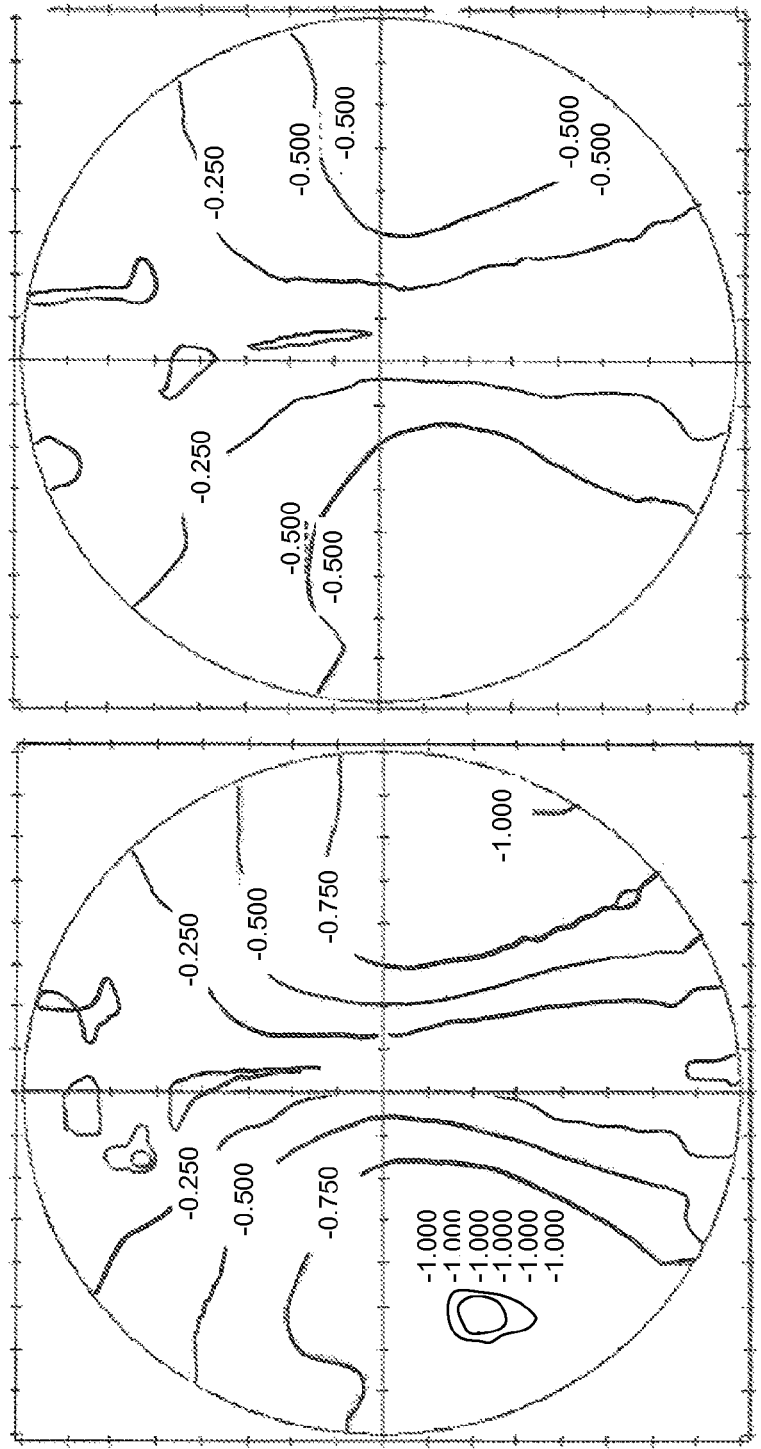
FIGS. 7A-7K show unwanted astigmatic contour maps comparing an existing state-of-the-art Progressive Addition Lens and embodiments of the invention which include a low add power Progressive Addition Lens and a dynamic optic.
Figure 7B:
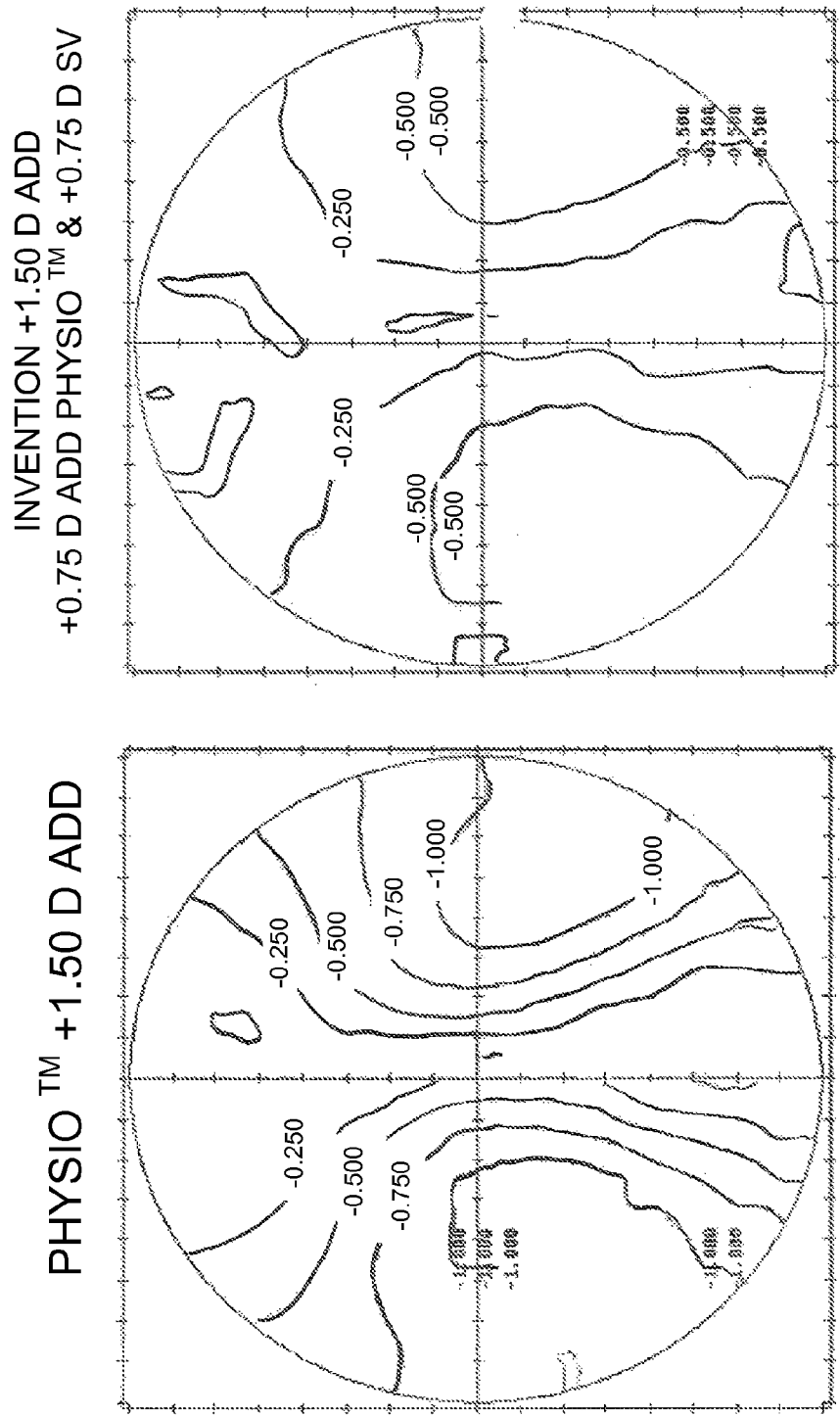
Figure 7C:
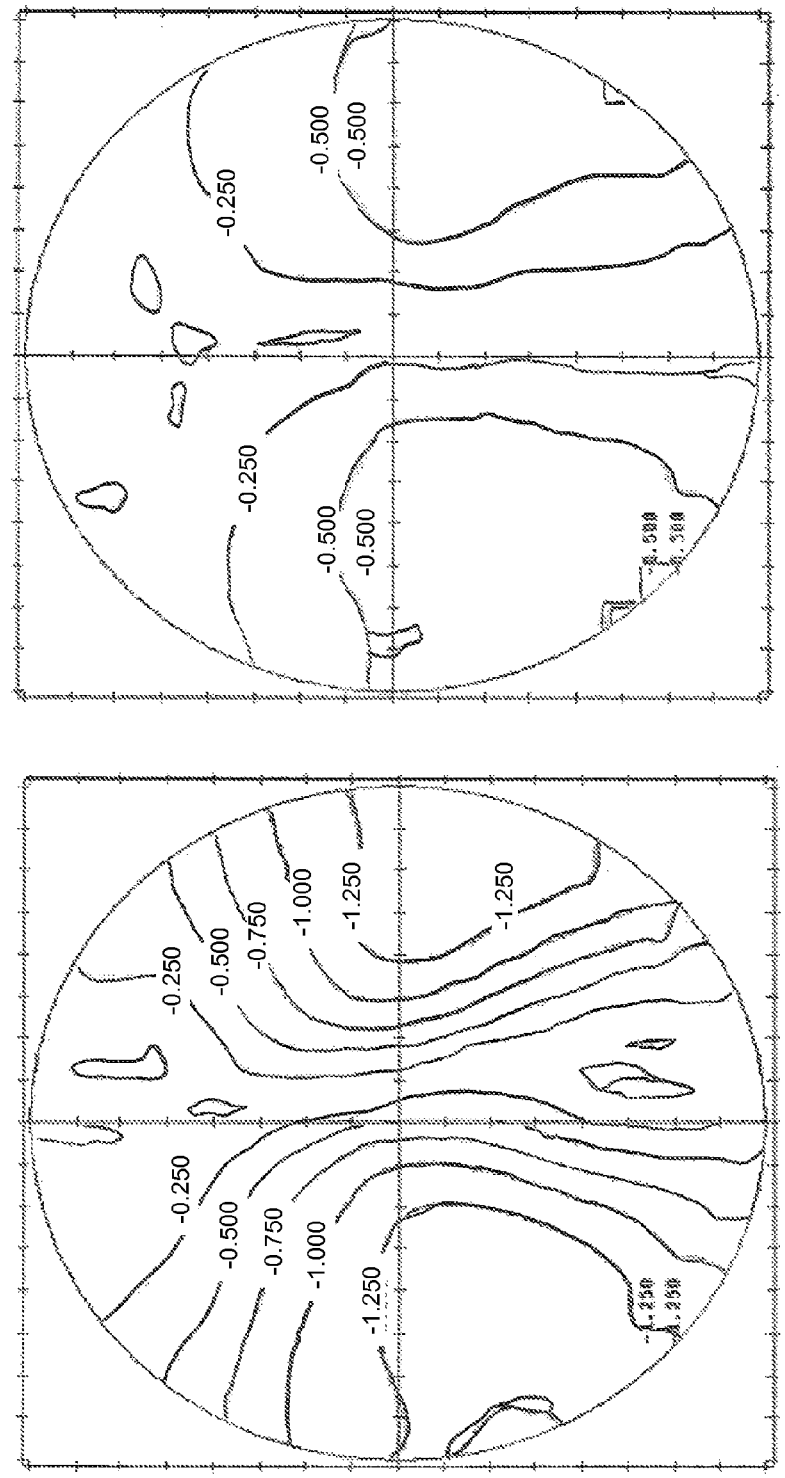
Figure 7D:
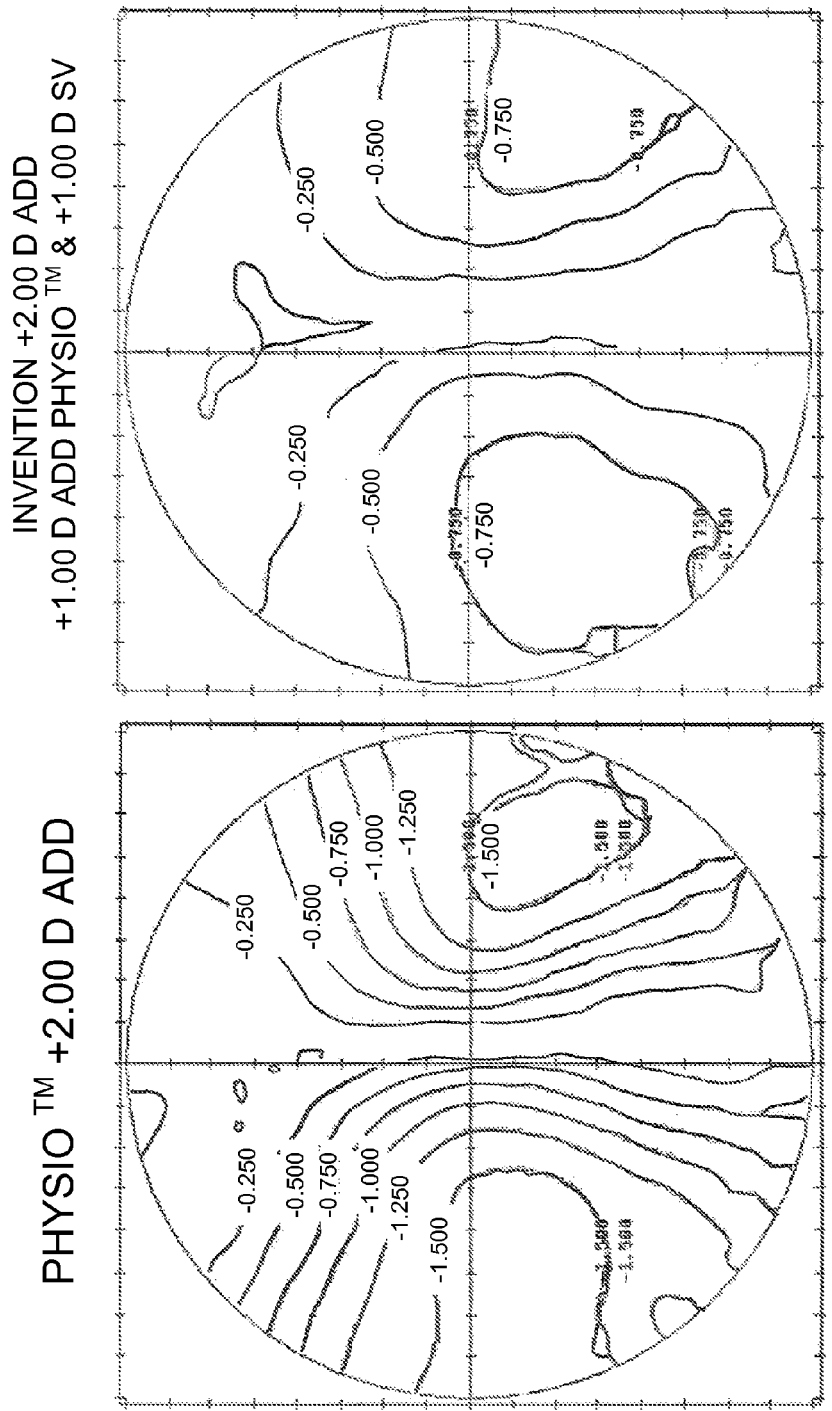
Figure 7E:
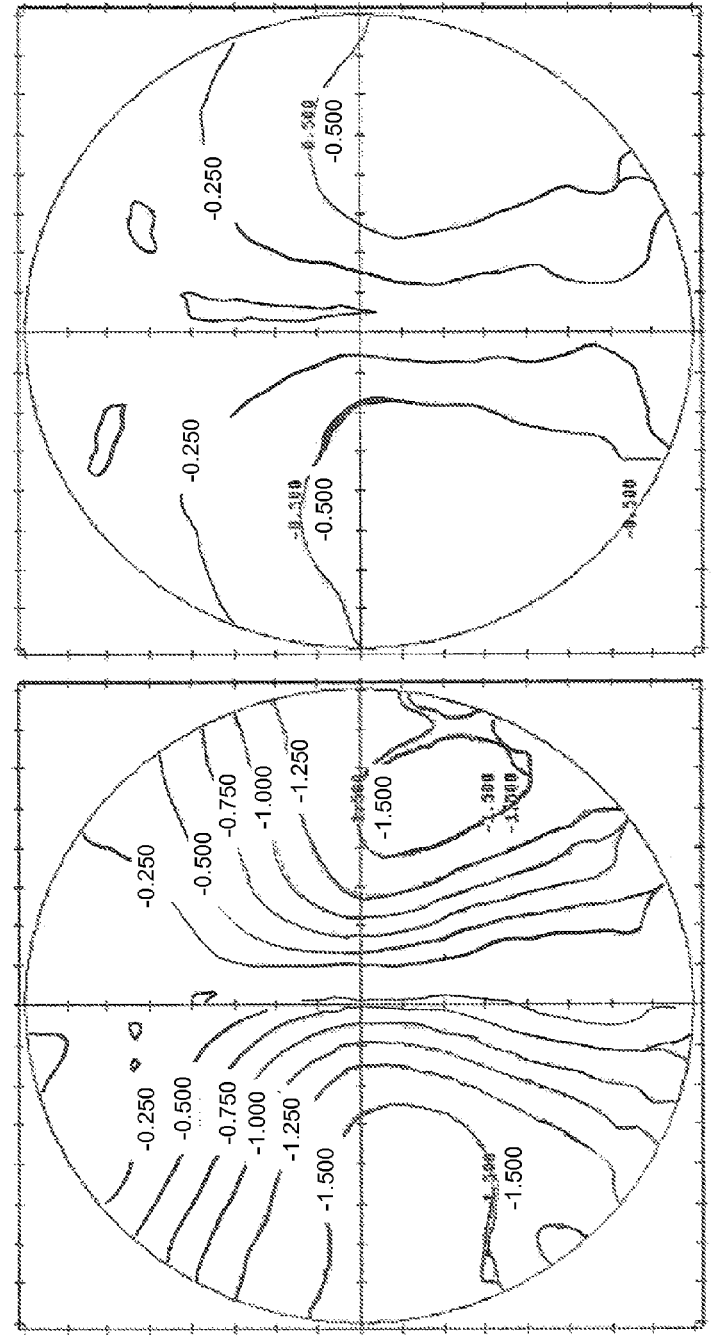
Figure 7F:
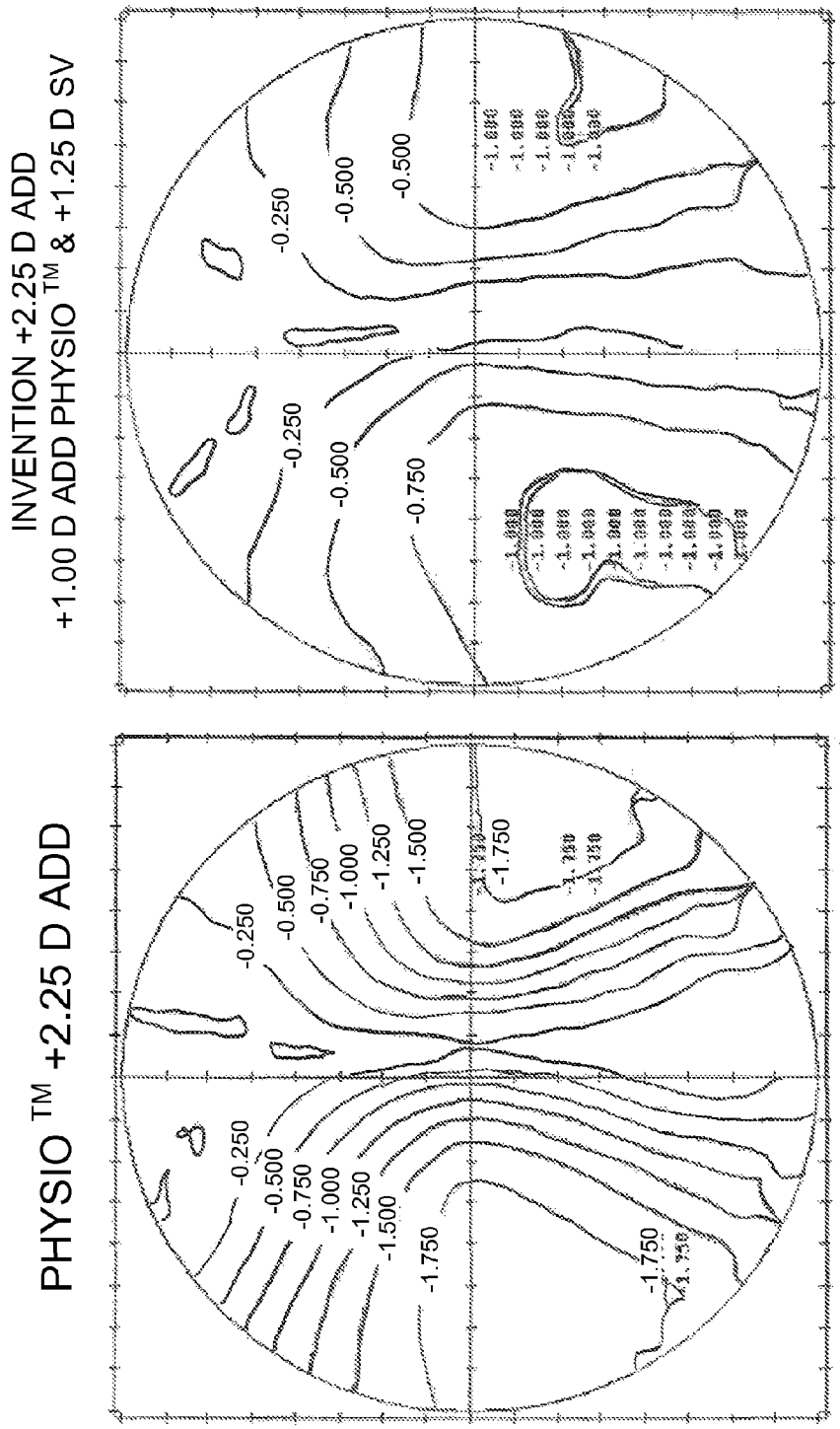
Figure 7G:
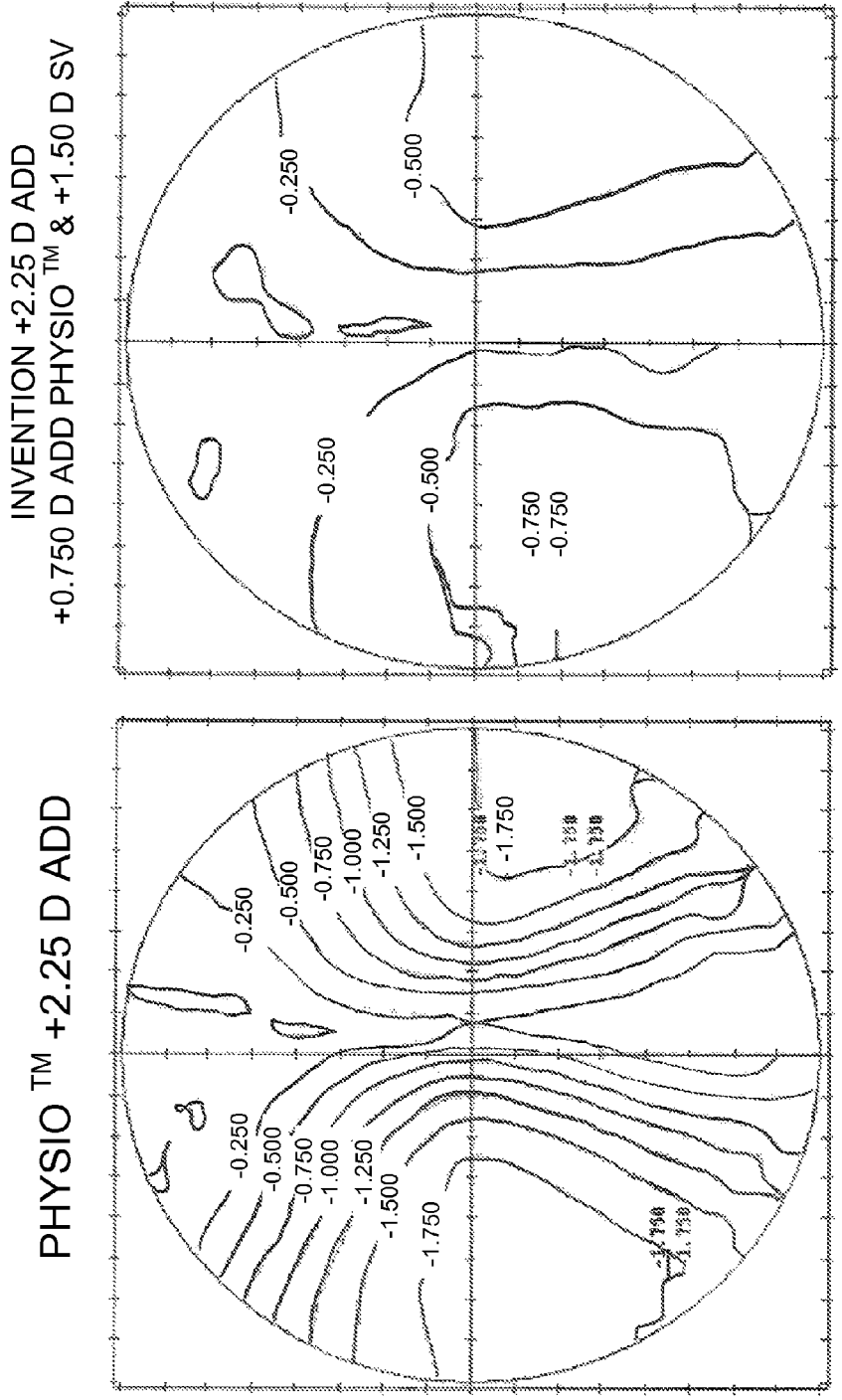
Figure 7H:
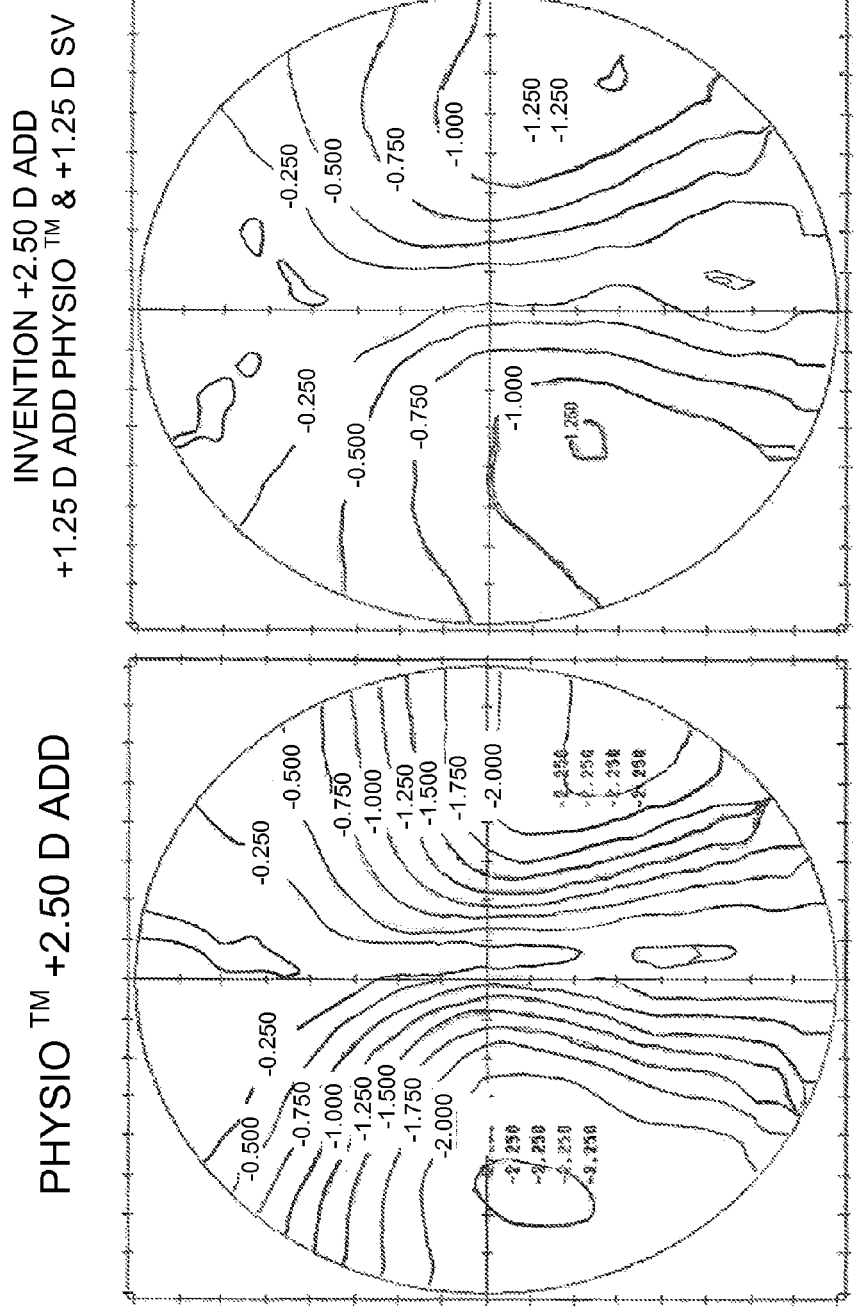
Figure 7I:
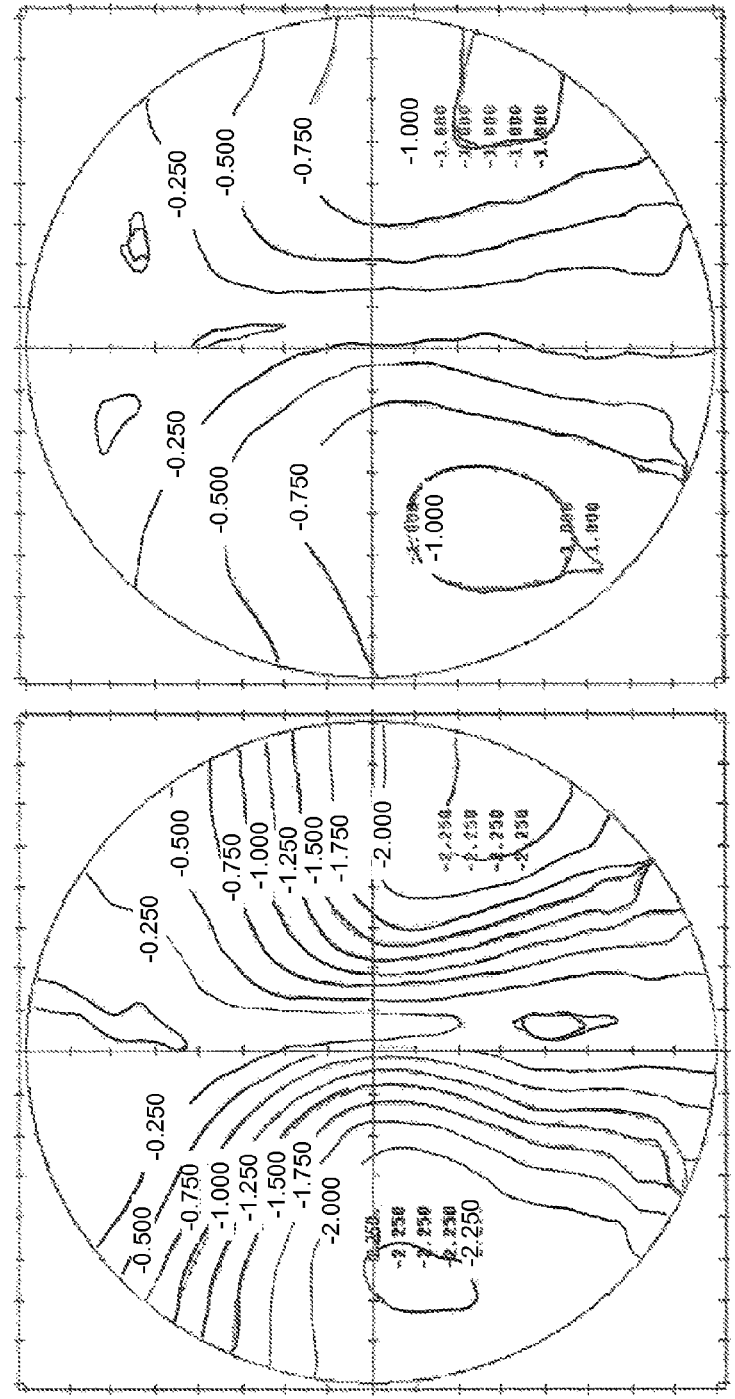
Figure 7J:
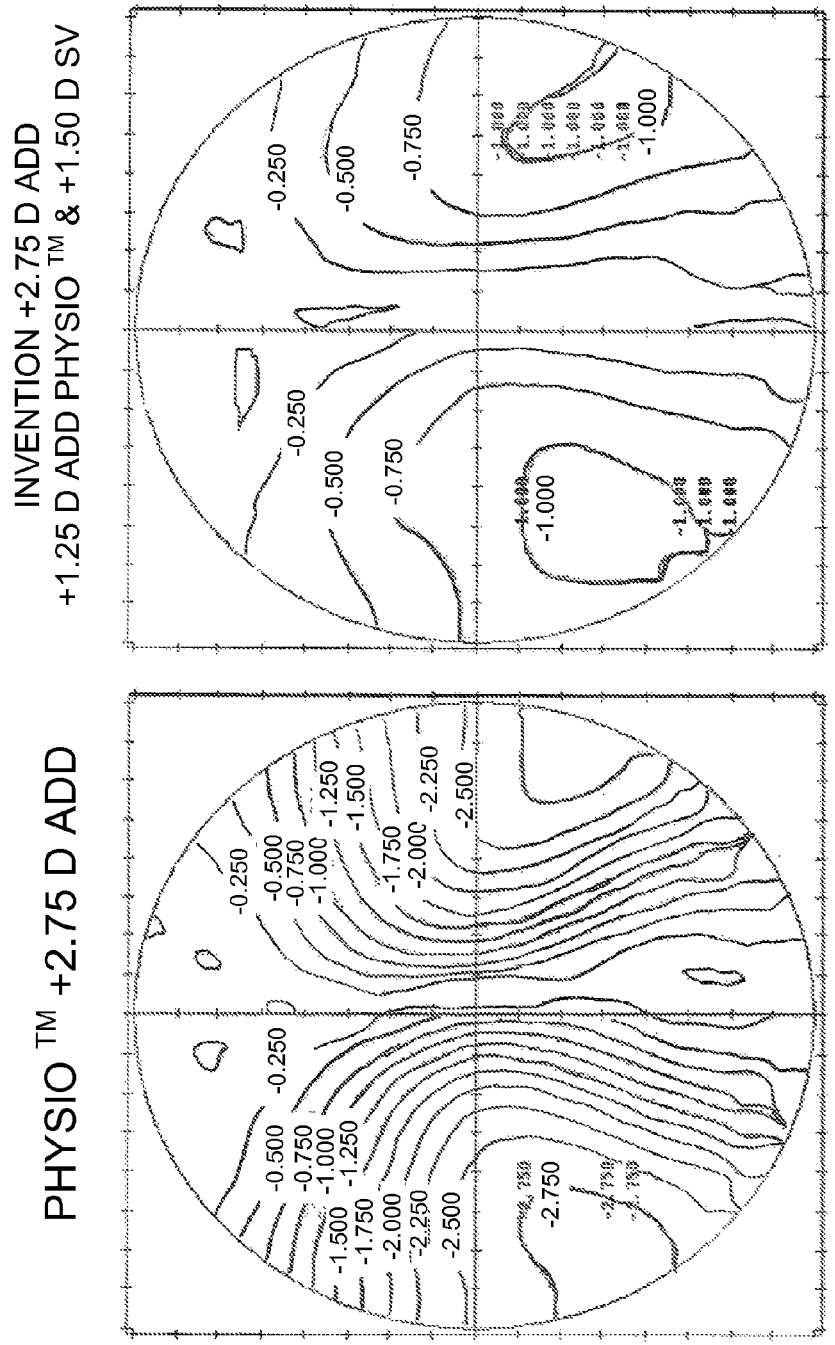
Figure 7K:
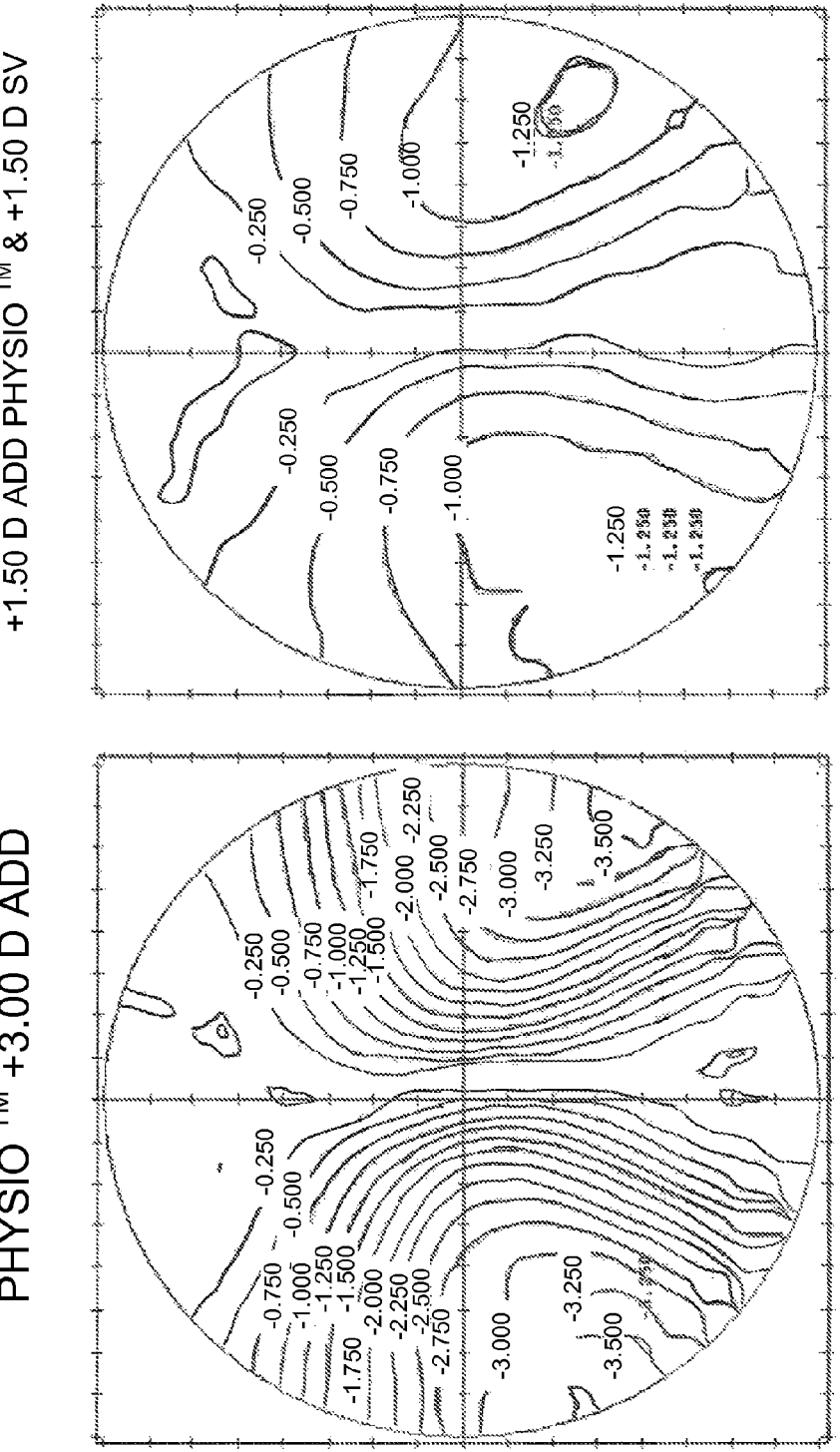

FIG. 7A compares an Essilor Varilux Physio™ +1.25 D PAL and an inventive embodiment including an Essilor Varilux Physio™ +1.00 D PAL and a +0.25 D dynamic optic to create a total add power of +1.25. FIG. 7B compares an Essilor Varilux Physio™ +1.50 D PAL and an inventive embodiment including an Essilor Varilux Physio™ +0.75 D PAL and a +0.75 D dynamic optic to create a total add power of +1.50 D. FIG. 7C compares an Essilor Varilux Physio™ +1.75 D PAL and an inventive embodiment including an Essilor Varilux Physio™ +1.00 D PAL and a +0.75 D dynamic optic to create a total add power of +1.75 D FIG. 7D compares an Essilor Varilux Physio™ +2.00 D PAL and an inventive embodiment including an Essilor Varilux Physio™ +1.00 D PAL and a +1.00 D dynamic optic to create a total add power of +2.00 D FIG. 7E compares an Essilor Varilux Physio™ +2.00 D PAL and an inventive embodiment including an Essilor Varilux Physio™ +0.75 D PAL and a +1.25 D dynamic optic to create a total add power of +2.00 D FIG. 7F compares an Essilor Varilux Physio™ +2.25 D PAL and an inventive embodiment including an Essilor Varilux Physio™ +1.00 D PAL and a +1.25 D dynamic optic to create a total add power of +2.25 D FIG. 7G compares an Essilor Varilux Physio™ +2.25 D PAL and an inventive embodiment including an Essilor Varilux Physio™ +035 D PAL and a +1.50 D dynamic optic to create a total add power of +2.25 D. FIG. 7H compares an Essilor Varilux Physio™ +2.50 D PAL and an inventive embodiment including an Essilor Varilux Physio™ +1.25 D PAL and a +1.25 D dynamic optic to create a total add power of +2.50 D. FIG. 7I compares an Essilor Varilux Physio™ +2.50 D PAL and an inventive embodiment including an Essilor Varilux Physio™ +1.00 D PAL and a +1.50 D dynamic optic to create a total add power of +2.50 D. FIG. 7J compares an Essilor Varilux Physio™ +2.75 D PAL and an inventive embodiment including an Essilor Varilux Physio™ +1.25 D PAL and a +1.50 D dynamic optic to create a total add power of +2.75 D. FIG. 7K compares an Essilor Varilux Physio™ +3.00 D PAL and an inventive embodiment including an Essilor Varilux Physio™ +1.50 D PAL and a +1.50 D dynamic optic to create a total add power of +3.00 D.

FIGS. 7A-7K clearly show the remarkable improvement the inventive approach makes over the current state-of-the art Progressive Addition Lenses. The inventive embodiments shown in FIGS. 7A-7K have significantly less distortion, significantly less unwanted astigmatism, a much wider channel width, and slightly shorter channel length for both lower add powers and higher add powers when compared to the current state-of-the-art PAL lenses. The inventive approach is able to provide these remarkable improvements while allowing a user to see clearly at a fat distance, an intermediate distance, and a near distance as with a conventional PAL lens.

It is further contemplated within the invention that the dynamic optic may need to be off-center vertically and in some cases horizontally relative to the progressive addition region depending upon the wearer's pupillary distance, fitting point, and dimensions of the frame eye-wire cut out. However, in all cases when the dynamic optic is off-center relative to the progressive addition region it remains in optical communication with the region when the dynamic optic is activated. It should be noted that the vertical dimension of the frame's eye-wire or rim will in many, but not all cases, determine this amount of off-centeredness.

The inventive ophthalmic lens allows for an optical transmission of 88% or more. If an antireflection coating is utilized on both surfaces of the ophthalmic lens the optical transmission will be in excess of 90%. The optical efficiency of the inventive ophthalmic lens is 90% or better. The inventive ophthalmic lens is capable of being coated with a variety of well-known lens treatments such as, by way of example only, an antireflection coating, a scratch resistant coating, a cushion coating, a hydrophobic coating, and an ultra-violet coating. The ultra-violet coating may be applied to the ophthalmic lens or to the dynamic optic. In embodiments in which the dynamic optic is a liquid-crystal based electro-active optic, the ultra-violet coating may protect the liquid crystal from ultra-violet light that could damage the liquid crystal over time. The inventive ophthalmic lens is also capable of being edged into the shape needed for an eyeglass flame, or drilled in its periphery so as to be mounted, by way of example only, in a rimless flame.

It should be further noted that the invention contemplates all ophthalmic lenses; contact lenses, intra-ocular lenses, corneal on-lays, corneal in-lays, and spectacle lenses.

What is claimed is:

1. An electro-active ophthalmic lens, comprising:
   a first substrate;
   a second substrate positioned opposite to said first substrate;
   a first electrode;
   a second electrode positioned between said first electrode and said second substrate, wherein the largest distance between the first and second electrode is less than 10 microns;
   an electro-active material including an outer perimeter that is inside an outer perimeter of the lens, and positioned between said first and second electrodes; and
   a first insulating layer positioned at least one of between said first and second electrodes or surrounding said first electrode of said electro-active ophthalmic lens.

2. The electro-active lens of claim 1, wherein the first substrate comprises a surface relief diffractive relief topological profile; and wherein the first electrode is positioned along said surface relief diffractive topological profile of said first substrate.

3. The electro-active lens of claim 2, wherein the second substrate has a substantially smooth topological profile facing said surface relief diffractive topological profile.

4. The electro-active lens of claim 1, wherein the voltage applied between the first and second electrode is not more than 5V.

5. The electro-active lens of claim 1, wherein the insulator is positioned so as to insulate an activated region from a non-activated region of the lens.

6. The electro-active lens of claim 1, wherein the electro-active material is configured to provide a diffractive optical effect.

7. The electro-active lens of claim 6, wherein at least one of the first electrode and the second electrode comprise concentrically arranged ring-shaped electrodes configured to provide the diffractive optical effect.

8. The electro-active lens of claim 1, wherein at least one of the first electrode and the second electrode are pixilated.

9. The electro-active lens of claim 1, wherein the lens is a multifocal lens.

10. The electro-active lens of claim 1, wherein the lens has optical power only when voltage is applied between the first and second electrodes, and has no optical power when voltage is not applied between the first and second electrodes.

11. The electro-active lens of claim 1, wherein said first insulating layer surrounds said first electrode, and the lens further comprises a second insulating layer surrounding said second electrode.

* * * * *